United States Patent
Sherry

(10) Patent No.: US 8,568,702 B2
(45) Date of Patent: Oct. 29, 2013

(54) USE AND APPLICATION OF DEFINED ZWITTERIONIC COPOLYMER

(75) Inventor: Alan Edward Sherry, Newport, KY (US)

(73) Assignee: The Procter & Gamble Company, Cincinnati, OH (US)

( * ) Notice: Subject to any disclaimer, the term of this patent is extended or adjusted under 35 U.S.C. 154(b) by 45 days.

(21) Appl. No.: 13/094,089

(22) Filed: Apr. 26, 2011

(65) Prior Publication Data

US 2011/0197382 A1      Aug. 18, 2011

Related U.S. Application Data

(62) Division of application No. 11/601,277, filed on Nov. 17, 2006, now abandoned.

(60) Provisional application No. 60/737,822, filed on Nov. 17, 2005.

(51) Int. Cl.
| | | |
|---|---|---|
| B08B 1/00 | (2006.01) | |
| C08F 220/60 | (2006.01) | |
| C08F 220/34 | (2006.01) | |
| C11D 3/37 | (2006.01) | |
| A61K 8/81 | (2006.01) | |

(52) U.S. Cl.
USPC ........ 424/70.16; 510/475; 526/307; 526/312; 15/104.93

(58) Field of Classification Search
None
See application file for complete search history.

(56) References Cited

U.S. PATENT DOCUMENTS

| | | | |
|---|---|---|---|
| 2,082,275 A | 6/1937 | Daimler et al. | |
| 2,255,082 A | 9/1941 | Orthner et al. | |
| 2,438,091 A | 3/1948 | Lynch | |
| 2,528,378 A | 10/1950 | McCabe, Jr. et al. | |
| 2,658,072 A | 11/1953 | Kosmin | |
| 2,702,279 A | 2/1955 | Funderburk et al. | |
| 3,661,875 A | 5/1972 | Sieja | |
| 3,699,103 A | 10/1972 | Kiss | |
| 3,770,731 A | 11/1973 | Jaeger | |
| 4,021,365 A | 5/1977 | Sinka et al. | |
| 4,062,817 A | 12/1977 | Westerman | |
| 4,076,648 A | 2/1978 | Rosen | |
| 4,076,663 A | 2/1978 | Masuda et al. | |
| 4,093,776 A | 6/1978 | Aoki et al. | |
| 4,387,017 A | 6/1983 | McEntire et al. | |
| 4,565,647 B1 | 1/1986 | Llenado | |
| 4,666,983 A | 5/1987 | Tsubakimoto et al. | |
| 4,734,478 A | 3/1988 | Tsubakimoto et al. | |
| 4,749,740 A | 6/1988 | Aizawa et al. | |
| 4,834,735 A | 5/1989 | Alemany et al. | |
| 4,983,316 A | 1/1991 | Starch | |
| 5,147,343 B1 | 9/1992 | Kellenberger | |
| 5,149,335 A | 9/1992 | Kellenberger et al. | |
| 5,480,586 A | 1/1996 | Jakubicki et al. | |
| 5,776,872 A | 7/1998 | Giret et al. | |
| 5,883,062 A | 3/1999 | Addison et al. | |
| 5,906,973 A | 5/1999 | Ouzounis et al. | |
| 6,045,622 A | 4/2000 | Holt et al. | |
| 6,569,261 B1 | 5/2003 | Aubay et al. | |
| 2004/0127378 A1 | 7/2004 | Sherry et al. | |
| 2008/0004202 A1 | 1/2008 | Wolfgang et al. | |

FOREIGN PATENT DOCUMENTS

| | | |
|---|---|---|
| EP | 0156646 B1 | 7/1988 |
| EP | 0217501 B1 | 7/1991 |
| EP | 0150872 B2 | 5/1993 |
| EP | 0499364 B1 | 10/1996 |
| WO | WO 86/05199 | 9/1986 |
| WO | WO 99/60089 | 11/1999 |
| WO | WO 01/57171 A | 8/2001 |

OTHER PUBLICATIONS

International Search Report 4 Pages.

*Primary Examiner* — David J Blanchard
*Assistant Examiner* — Garen Gotfredson
(74) *Attorney, Agent, or Firm* — Amy I Ahn-Roll

(57) ABSTRACT

The present invention relates to the use and application of a water-soluble or water-dispersible copolymer comprising:
a) at least a monomer compound of general formula i:

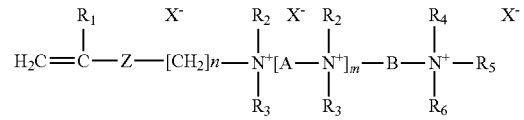

in which
$R_1$ is a hydrogen atom, a methyl or ethyl group;
$R_2$, $R_3$, $R_4$, $R_5$ and $R_6$, which are identical or different, are linear or branched $C_1$-$C_6$, alkyl, hydroxyalkyl or aminoalkyl groups;
m is an integer from 0 to 10;
n is an integer from 1 to 6;
Z represents a —C(O)O— or —C(O)NH— group or an oxygen atom;
A represents a $(CH_2)_p$ group, p being an integer from 1 to 6;
B represents a linear or branched $C_2$-$C_{12}$, polymethylene chain optionally interrupted by one or more heteroatoms or heterogroups, and optionally substituted by one or more hydroxyl or amino groups;
X, which are identical or different, represent counterions; and
(b) at least one hydrophilic monomer carrying a functional acidic group which is copolymerizable with (a) and which is capable of being ionized in the application medium;
(c) optionally at least one monomer compound with ethylenic unsaturation with a neutral charge which is copolymerizable with (a) and (b), preferably a hydrophilic monomer compound with ethylenic unsaturation with a neutral charge, carrying one or more hydrophilic groups, which is copolymerizable with (a) and (b).
Said polymer is a particularly good agglomerating agent and can preferentially be used in cleaning operations.

8 Claims, No Drawings

USE AND APPLICATION OF DEFINED ZWITTERIONIC COPOLYMER

CROSS REFERENCE TO RELATED APPLICATION

This application is a divisional of U.S. patent application Ser. No. 11/601,277, filed on Nov. 17, 2006, now abandoned, which claims priority to U.S. Provisional Application No. 60/737,822, filed on Nov. 17, 2005.

FIELD OF THE INVENTION

The present invention relates to the use and application of a zwitterionic polymer of defined structure. More specifically it relates to the application of said polymer in a composition, said composition being preferably suitable for cleaning operations, such as the cleaning of floors, work surfaces, appliances, furniture, carpet and upholstery.

BACKGROUND OF THE INVENTION

Manufacturers of cleaning products are continuously searching for new components that will improve the effectiveness of the composition, the device that delivers the composition or both. The present invention relates to a new ingredient for use in cleaning of surfaces such as floors, tiles, work surfaces, car interior plastics and leathers, ceramic surfaces, windows, blinds, shades, mirrors, household appliances, furniture, upholstery etc. In general terms, compositions for cleaning surfaces are effective at releasing the soil from the surface, suspending or solubilising the soil. However if the suspended or solubilised soil is not picked up in some way, then the soil remains on the surface and will be visible on the surface once the composition evaporates. The Applicants having investigated this problem have developed a new composition comprising a component that agglomerates soils, especially inorganic soils and soils comprising particulates such as soot, clay, dust, hair, toothpaste, mixtures of oils and dust, and the like. These soils are typically found in homes and businesses as well as in motorized vehicles. A soil agglomerate is larger than a non-agglomerated soil and is therefore easier to remove from the surface. Soil agglomerate removal is aided by using a disposable cleaning substrate chosen to bind the agglomerating agent.

SUMMARY OF THE INVENTION

According to the present invention there is provided a new use of a water-soluble or water-dispersible copolymer I as an agglomerating agent in a cleaning operation, said polymer comprising:
a) at least a monomer compound of general formula i:

$$H_2C=\overset{R_1}{\underset{}{C}}-Z-[CH_2]n-\overset{X^-}{\underset{R_3}{\overset{|}{N^+}}}[A-\overset{X^-}{\underset{R_3}{\overset{R_2}{\overset{|}{N^+}}}}]_m-B-\overset{X^-}{\underset{R_6}{\overset{R_4}{\overset{|}{N^+}}}}-R_5$$

in which
$R_1$ is a hydrogen atom, a methyl or ethyl group;
$R_2$, $R_3$, $R_4$, $R_5$ and $R_6$, which are identical or different, are linear or branched $C_1$-$C_6$, alkyl, hydroxyalkyl or aminoalkyl groups;
m is an integer from 0 to 10;
n is an integer from 1 to 6;
Z represents a —C(O)O— or —C(O)NH— group or an oxygen atom;
A represents a $(CH_2)_p$ group, p being an integer from 1 to 6;
B represents a linear or branched $C_2$-$C_{12}$, polymethylene chain optionally interrupted by one or more heteroatoms or heterogroups, and optionally substituted by one or more hydroxyl or amino groups;
X, which are identical or different, represent counterions; and
(b) at least one hydrophilic monomer carrying a functional acidic group which is copolymerizable with (a) and which is capable of being ionized in the application medium;
(c) optionally at least one monomer compound with ethylenic unsaturation with a neutral charge which is copolymerizable with (a) and (b), preferably a hydrophilic monomer compound with ethylenic unsaturation with a neutral charge, carrying one or more hydrophilic groups, which is copolymerizable with (a) and (b).

In a second embodiment there is provided a composition comprising a surfactant selected from nonionic, amphoteric, zwitterionic surfactants and mixtures thereof, a water-soluble or water-dispersible copolymer I comprising:
a) at least a monomer compound of general formula i:

$$H_2C=\overset{R_1}{\underset{}{C}}-Z-[CH_2]n-\overset{X^-}{\underset{R_3}{\overset{|}{N^+}}}[A-\overset{X^-}{\underset{R_3}{\overset{R_2}{\overset{|}{N^+}}}}]_m-B-\overset{X^-}{\underset{R_6}{\overset{R_4}{\overset{|}{N^+}}}}-R_5$$

in which
$R_1$ is a hydrogen atom, a methyl or ethyl group;
$R_2$, $R_3$, $R_4$, $R_5$ and $R_6$, which are identical or different, are linear or branched $C_1$-$C_6$, alkyl, hydroxyalkyl or aminoalkyl groups;
m is an integer from 0 to 10;
n is an integer from 1 to 6;
Z represents a —C(O)O— or —C(O)NH— group or an oxygen atom;
A represents a $(CH_2)_p$ group, p being an integer from 1 to 6;
B represents a linear or branched $C_2$-$C_{12}$, polymethylene chain optionally interrupted by one or more heteroatoms or heterogroups, and optionally substituted by one or more hydroxyl or amino groups;
X, which are identical or different, represent counterions; and
(b) at least one hydrophilic monomer carrying a functional acidic group which is copolymerizable with (a) and which is capable of being ionized in the application medium;
(c) optionally at least one monomer compound with ethylenic unsaturation with a neutral charge which is copolymerizable with (a) and (b), preferably a hydrophilic monomer compound with ethylenic unsaturation with a neutral charge, carrying one or more hydrophilic groups, which is copolymerizable with (a) and (b);
and a surface stickiness mitigator selected from the group consisting of alkyl aryl anionic surfactant or a copolymer II comprising
d) at least one monomer having the general formula II:

$$H_2C=\overset{R_1}{\underset{}{C}}-[CH_2]n-\overset{R_2}{\underset{R_3}{\overset{|}{N^+}}}-[CH_2]m-\overset{R_4}{\underset{}{C}}=CH_2 \quad X^-$$

in which,
R1 and R4 independently represent H or a C1-6 linear or branched alkyl group
R2 and R3 independently represent a linear or branched C1-6 alkyl, hydroxyalkyl or aminoalkyl group, preferably a methyl group
n and m are integers of between 1 and 3
X represents a counterion compatible with the water-soluble or water-dispersible nature of the polymer;
e) at least one hydrophilic monomer with an acid functionality that is copolymerisable with monomer d) and capable of ionizing in the medium in which it is used; and
f) optionally an ethylenically unsaturated hydrophilic monomer compound of neutral charge bearing one or several hydrophilic groups which is copolymerisable with monomers d) and e), the monomer d) to monomer e) ratio ranging from between 60:40 and 5:95;
wherein the ratio of water-soluble or water-dispersible copolymer to surface stickiness mitigator is from 10:1 to 1:10.

In a third embodiment there is provided a kit for cleaning a surface comprising a composition comprising a nonwoven substrate and a water-soluble or water-dispersible copolymer I comprising:
a) at least a monomer compound of general formula i:

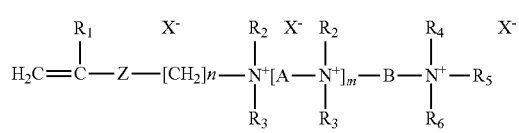

in which
$R_1$ is a hydrogen atom, a methyl or ethyl group;
$R_2$, $R_3$, $R_4$, $R_5$ and $R_6$, which are identical or different, are linear or branched $C_1$-$C_6$, alkyl, hydroxyalkyl or aminoalkyl groups;
m is an integer from 0 to 10;
n is an integer from 1 to 6;
Z represents a —C(O)O— or —C(O)NH— group or an oxygen atom;
A represents a $(CH_2)_p$ group, p being an integer from 1 to 6;
B represents a linear or branched $C_2$-$C_{12}$, polymethylene chain optionally interrupted by one or more heteroatoms or heterogroups, and optionally substituted by one or more hydroxyl or amino groups;
X, which are identical or different, represent counterions; and
(b) at least one hydrophilic monomer carrying a functional acidic group which is copolymerizable with (a) and which is capable of being ionized in the application medium;
(c) optionally at least one monomer compound with ethylenic unsaturation with a neutral charge which is copolymerizable with (a) and (b), preferably a hydrophilic monomer compound with ethylenic unsaturation with a neutral charge, carrying one or more hydrophilic groups, which is copolymerizable with (a) and (b).

DETAILED DESCRIPTION OF THE INVENTION

Definitions: All ratios and percentages are on a weight basis unless otherwise specified.
By 'aqueous' composition, it is meant water and solvents that have a 5% or more water solubility on a weight basis. Non-limiting examples of aqueous chemicals include deionized water, distilled water, city water, ethanol, 2-propanol, glycerine and propylene glycol n-butyl ether.

By 'ready-to-use composition', it is meant composition concentrations that used by the consumer for actual cleaning purposes. The 'ready to use' concentration is often the same as the composition concentration supplied by the manufacturer. In some instances, manufacturers will supply a composition as a concentrate and direct the consumer to dilute the composition via usage instructions; in those instances, the ready-to-use composition means the concentration of the diluted product. Unless otherwise specified all concentrations herein below are supplied on a ready-to-use basis.

By 'wipe' it is meant a nonwoven of convenient size for use by the consumer. By 'convenient size' it is meant x-y dimensions that allow the consumer to use the wipe/pad by hand or to fit the wipe/pad onto a typical cleaning implement as available commercially or described in the art. Non-limiting examples of convenient wipe and pad sizes include 16 cm×27 cm, 17 cm×20 cm, 10 cm×30 cm, 20 cm×30 cm, 15 cm×36 cm, 20 cm×40 cm, and the like. A 'pad' consists of a laminate of wipes. Laminates comprise two or more nonwoven substrates that are bound, fused, glued, conformed or heat sealed together for the purpose of creating a single structure to be used by the consumer. The wipe or pad can be dry, dry to the touch or premoistened.

As used herein, the terms 'nonwoven', 'substrate' and 'nonwoven substrate' are used interchangeably. Nonwoven substrates are absorbent and preferably disposable. By 'absorbent' it is meant that the nonwoven can absorb at least one gram of de-ionized water per gram of dry nonwoven substrate. By 'disposable' it is meant that the nonwoven is typically used for a single cleaning job and then disposed of. In some cases, the disposable substrate has limited reusability in that it can be used, stored and re-used. As such the amount of re-use is limited and is typically determined by the ability of the substrate to continue to absorb more liquid and/or soil. Unlike sponges, cloths, chamois and other conventional cleaning implements, the disposable substrate, once used, can not be easily reversed to its original state by the consumer.

By 'synthetic material' or 'synthetic fibers', it is meant herein a hydrophobic material based on polymeric organic polymers. The synthetic material herein is selected from the group consisting of polyethylene, polypropylene, polyester, copolyesters, and mixtures and derivatives thereof. Other synthetic materials include polyvinyl acetate, polyethylvinyl acetate, polyvinyl chloride, polyvinylidene chloride, polyacrylics, polyamides, copolyamides, polystyrenes, polyurethanes and copolymers of any of the foregoing such as vinyl chloride/vinyl acetate. As used herein, the terms 'thermoplastic' materials are synthetic materials that can be melted at temperatures between 75° C. and 175° C.

As used herein, 'non-synthetic material or 'non-synthetic fibers', refers to materials or fibers that are based on naturally occurring materials and are either synthetically modified or unmodified. Examples of suitable unmodified/modified naturally occurring fibers include cotton, Esparto grass, bagasse, hemp, flax, silk, wool, wood pulp, chemically modified wood pulp, jute, ethyl cellulose, and cellulose acetate. Non-synthetic materials and fibers used herein are preferably based on treated or untreated cellulose, especially wood pulp and synthetic cellulose derivatives including Rayon® and Lyocell®.

By 'superabsorbent material', it is meant any material lodged inside or on an absorbent disposable substrate, that effectively traps and locks water and water-based solutions, effectively removing water or water-based solutions from the floor. A "superabsorbent material" is any absorbent material having a g/g capacity for deionized water of at least about 15 g/g, when measured under a confining pressure of 0.3 psi. Superabsorbent materials are typically high molecular weight polycarboxylate polymers that can gel upon acquisition of large amounts of aqueous composition, especially aqueous compositions that are predominantly water.

Water-Soluble or Water-Dispersible Copolymer I

The water-soluble or water-dispersible agglomerating copolymer I of the present invention comprises, in the form of polymerized units:

a) at least a monomer compound of general formula i:

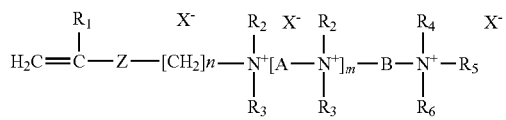

in which $R_1$ is a hydrogen atom, a methyl or ethyl group;

$R_2$, $R_3$, $R_4$, $R_5$ and $R_6$, which are identical or different, are linear or branched $C_1$-$C_6$, alkyl, hydroxyalkyl or aminoalkyl groups;

m is an integer from 0 to 10;

n is an integer from 1 to 6;

Z represents a —C(O)O— or —C(O)NH— group or an oxygen atom;

A represents a $(CH_2)_p$ group, p being an integer from 1 to 6;

B represents a linear or branched $C_2$-$C_{12}$, polymethylene chain optionally interrupted by one or more heteroatoms or heterogroups, and optionally substituted by one or more hydroxyl or amino groups;

X, which are identical or different, represent counterions; and (b) at least one hydrophilic monomer carrying a functional acidic group which is copolymerizable with (a) and which is capable of being ionized in the application medium;

(c) optionally at least one monomer compound with ethylenic unsaturation with a neutral charge which is copolymerizable with (a) and (b), preferably a hydrophilic monomer compound with ethylenic unsaturation with a neutral charge, carrying one or more hydrophilic groups, which is copolymerizable with (a) and (b).

The monomer (a) can be prepared, for example, according to the reaction schemes shown in U.S. Pat. No. 6,569,261 to Rhodia, column 2, line 40 to column 3, line 45 which is incorporated herein by reference.

The resulting copolymer I has a molecular mass of at least 1000, advantageously of at least 10,000; it can range up to 20,000,000, advantageously up to 10,000,000. Except when otherwise indicated, when the term molecular mass is used, it will refer to the weight-average molecular mass, expressed in g/mol. The latter can be determined by aqueous gel permeation chromatography (GPC) or measurement of the intrinsic viscosity in a 1N $NaNO_3$ solution at 30° C. The copolymer is preferably a random copolymer.

Preferably, in the general formula (I) of the monomer (a), Z represents C(O)O, C(O)NH or O, very preferably C(O)NH; n is equal to 2 or 3, very particularly 3; m ranges from 0 to 2 and is preferably equal to 0 or 1, very particularly to 0; B represents —CH2-CH(OH)—(CH2)q, with q from 1 to 4, preferably equal to 1; $R_1$ to $R_6$, which are identical or different, represent a methyl or ethyl group.

A preferred monomer (a) is a diquat of following formula:

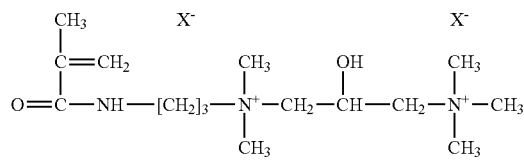

in which X⁻ representing the chloride ion.

Other particularly advantageous monomers (a) are:

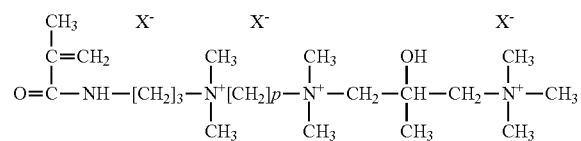

wherein p=2 to 4.

The X anions are in particular a halogen, preferably chlorine, sulfonate, sulfate, hydrogensulfate, phosphate, phosphonate, citrate, formate and acetate anion.

The monomers (b) are advantageously $C_3$-$C_8$ carboxylic, sulfonic, sulfuric, phosphoric or phosphoric acids with monoethylenic unsaturation, their anhydrides and their salts which are soluble in water and mixture thereof. Preferred monomers (b) are acrylic acid, methacrylic acid, α-ethacrylic acid, β,β-dimethylacrylic acid, methylenemalonic acid, vinylacetic acid, allylacetic acid, ethylidineacetic acid, propylidineacetic acid, crotonic acid, maleic acid, fumaric acid, itaconic acid, citraconic acid, mesaconic acid, N-(methacroyl)alanine, N-(acryloyl)hydroxyglycine, sulfopropyl acrylate, sulfoethyl acrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate, phosphonopropyl methacrylate and the alkali metal and ammonium salts thereof and mixtures thereof.

Preferred optional monomers (c) include acrylamide, vinyl alcohol, $C_1$-$C_4$ alkyl esters of acrylic acid and of methacrylic acid, $C_1$-$C_4$ hydroxyalkyl esters of acrylic acid and of methacrylic acid, in particular ethylene glycol and propylene glycol acrylate and methacrylate, polyalkoxylated esters of acrylic acid and of methacrylic acid, in particular the polyethylene glycol and polypropylene glycol esters, esters of acrylic acid or of methacrylic acid and of polyethylene glycol or polypropylene glycol $C_1$-$C_{25}$ monoalkyl ethers, vinyl acetate, vinylpyrrolidone or methyl vinyl ether and mixtures thereof.

The level of monomers (a) is advantageously between 3 and 80 mol %, preferably 10 to 70 mol %. The level of monomers (b) is advantageously between 10 and 95 mol %, preferably 20 to 80 mol %. The level of monomers (c) is advantageously between 0 and 50%, preferably 0 and 30%. The molar ratio of cationic monomer to the anionic monomer (a)/(b) is advantageously between 80/20 and 5/95, preferably between 60/40 and 20/80.

The copolymers of the invention can be obtained according to known techniques for the preparation of copolymers, in particular by polymerization by the radical route of the starting ethylenically unsaturated monomers, which are known compounds or compounds which can be easily obtained by a person skilled in the art by employing conventional synthetic processes of organic chemistry. Reference may in particular be made to the processes disclosed in U.S. Pat. No. 4,387,017 and EP 156,646. The radical polymerization is preferably carried out in an environment which is devoid of oxygen, for example in the presence of an inert gas (helium, argon, and the like) or of nitrogen. The reaction is carried out in an inert solvent, preferably ethanol or methanol, and more preferably in water. The polymerization is initiated by addition of a polymerization initiator. The initiators used are the free radical initiators commonly used in the art. Examples comprise organic peresters (t-butylperoxy pivalate, t-amylperoxy pivalate, t-butylperoxy α-ethylhexanoate, and the like); organic compounds of azo type, for example azobisamidinopropane hydrochloride, azobisisobutyronitrile, azobis(2,4-dimethylvaleronitrile), and the like); inorganic and organic peroxides, for example hydrogen peroxide, benzyl peroxide and butyl peroxide, and the like; redox initiating systems, for example those comprising oxidizing agents, such as persulfates (in particular ammonium or alkali metal persulfates, and the like); chlorates and bromates (including inorganic or organic chlorates and/or bromates); reducing agents, such as sulfites and bisulfites (including inorganic and/or organic sulfites or bisulfites); oxalic acid and ascorbic acid, as well as the mixtures of two or more of these compounds. Preferred initiators are water-soluble initiators. Sodium persulfate and azobisamidinopropane hydrochloride are in particular preferred. In an alternative form, the polymerization can be initiated by irradiation using ultraviolet light. The amount of initiators used is generally an amount sufficient can produce initiation of the polymerization. The initiators are preferably present in an amount ranging from 0.001 to approximately 10% by weight with respect to the total weight of the monomers and are preferably in an amount of less than 0.5% by weight with respect to the total weight of the monomers, a preferred amount being situated in the range from 0.005 to 0.5% by weight with respect to the total weight of the monomers. The initiator is added to the polymerization mixture either continuously or noncontinuously. When it is wished to obtain copolymers of high molecular mass, it is desirable to add fresh initiator during the polymerization reaction. The gradual or noncontinuous addition also makes possible a more efficient polymerization and a shorter reaction time. The polymerization is carried out under reaction conditions which are effective in polymerizing the monomers (a), the monomers (b) and optionally the monomers (c) under an atmosphere devoid of oxygen. The reaction is preferably carried out at a temperature ranging from approximately 30° to approximately 100° and preferably between 60° and 90° C. The atmosphere which is devoid of oxygen is maintained throughout the duration of the reaction, for example by maintaining a nitrogen flow throughout the reaction.

A particularly preferred copolymer I is the following:

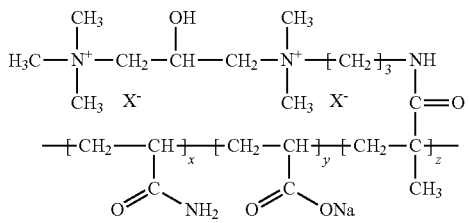

with x having a mean value of 0 to 50 mol %, preferably of 0 to 30 mol %, y having a mean value of 10 to 95 mol %, preferably of 20 to 80 mol %, z having a mean value of 3 to 80 mol %, preferably of 10 to 70 mol % and the y/z ratio preferably being of the order of 4/1 to 1/2, with x+y+z=100%, x, y and z representing the mol % of units derived from acrylamide, acrylic acid (sodium salt) and from Diquat respectively.

Other preferred copolymer I chemical structures are as follows:

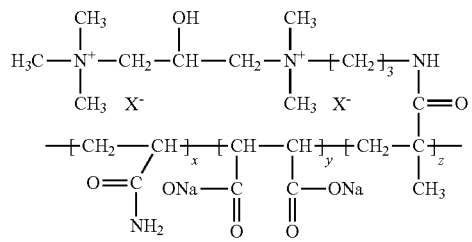

with x having a mean value of 0 to 50 mol %, preferably of 0 to 30 mol %, y having a mean value of 10 to 95 mol %, preferably of 20 to 80 mol %. z having a mean value of 3 to 80 mol %, preferably of 10 to 70 mol % and the y:z ratio preferably being of the order of 4:1 to 1:2;

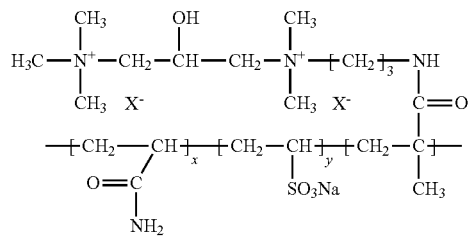

wherein x has a mean value of 0 to 50 mol %, preferably of 0 to 30 mol %, y has a mean value of 10 to 95 mol %, preferably of 20 to 80 mol %; z has a mean value of 3 to 80 mol %, preferably of 10 to 70 mol %, and the y:z ratio preferably being of the order of 4:1 to 1:2;

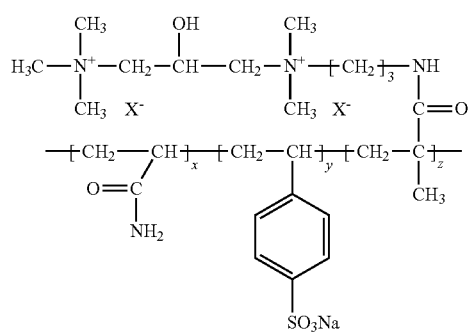

with x has a mean value of 0 to 50%, preferably of 0 to 30 mol %, y has a mean value of 10 to 95 mol %, preferably of 20 to 80 mol %, z has a mean value of 3 to 80 mol %, preferably of 10 to 70 mol %, and the y:z ratio preferably being of the order of 4:1 to 1:2;

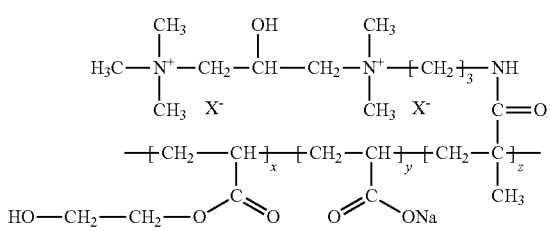

wherein x having a mean value of 0 to 50 mol %, preferably of 0 to 30 mol %, y has a mean value of 10 to 95 mol %, preferably of 20 to 80 mol %, z has a mean value of 3 to 80 mol %, preferably of 10 to 70 mol %, and the y:z ratio preferably being of the order of 4:1 to 1:2;

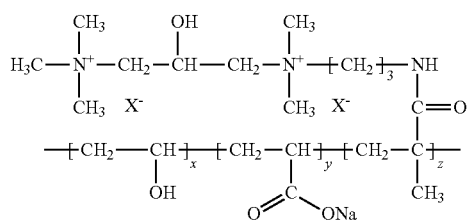

wherein x has a mean value of 0 to 50 mol %, preferably of 0 to 30 mol %, y has a mean value of 10 to 95 mol %, preferably of 20 to 80 mol %, z has a mean value of 3 to 80 mol %, preferably of 10 to 70 mol %, and the y:z ratio preferably being of the order of 4:1 to 1:2; or

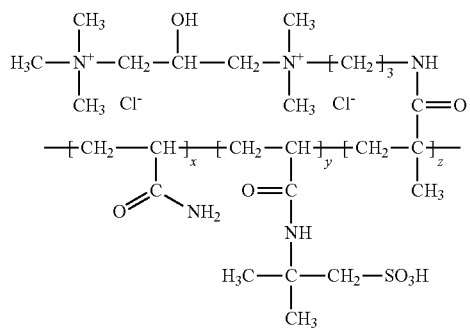

wherein x has a mean value of 0 to 50 mol %, preferably of 0 to 30 mol %, y has a mean value of 10 to 95 mol %, preferably of 20 to 80 mol %, z has a mean value of 3 to 80 mol %, preferably of 10 to 70 mol %, and the y:z ratio preferably being of the order of 4:1 to 1:2.

Preferred copolymers are available from Rhodia. In the composition of the present invention, the copolymer I is preferably present at a level of from 0.001% to 10%, more preferably from 0.005% to 1%, most preferably from 0.01% to 0.5% by weight of the composition.

Composition

In one embodiment, the composition of the present invention comprises copolymer I described above, a surfactant and a 'surface stickiness mitigator'. The composition is preferably aqueous, more preferably comprising at least 80%, more preferably at least 85%, still more preferably at least 90%, and most preferably at least 95% aqueous chemicals on a ready-to-use basis. Concentrates of the ready-to-use composition can be made with an aqueous chemical content lower than 80%; however, the ready-to-use composition, which is diluted from the concentrate according to manufacturer usage instructions, will have an aqueous content of 80% or more.

Surfactants

The compositions of the present invention comprise a nonionic, zwitterionic and amphoteric surfactant or mixtures thereof. Said surfactant is preferably present at a level of from about 0.005% to about 1.00% of the ready-to-use composition. Suitable surfactants are those selected from the group consisting of nonionic, zwitterionic and amphoteric surfactants, having hydrophobic chains containing from about 8 to about 18 carbon atoms. Examples of suitable surfactants are described in McCutcheon's Vol. 1: Emulsifiers and Detergents, North American Ed., McCutcheon Division, MC Publishing Co., 2002. Preferably, the aqueous compositions comprise from about 0.005% to about 0.75%, more preferably from about 0.0075% to about 0.50%, still more preferably from about 0.01% to about 0.40%, and most preferably from about 0.01% to about 0.30% surfactants. The exact level of surfactants in the compositions depends on a number of factors including surfactant type, class and chain-length, desired level of copolymer I in the composition and application end use. Accordingly, preferred ready-to-use surfactant levels for countertop and appliance cleaning applications range from about 0.10% to about 0.50%; preferred ready-to-use surfactant levels for floor cleaning applications are lower, less than about 0.20%.

Non-ionic surfactants are highly preferred for use in the compositions of the present invention. Non-limiting examples of suitable non-ionic surfactants include alcohol alkoxylates, alkyl polysaccharides, amine oxides, block copolymers of ethylene oxide and propylene oxide, fluoro surfactants and silicon based surfactants. If present, non-ionic surfactants preferably comprise from about 0.001% to about 0.50% by weight of the composition. Preferably, the aqueous compositions comprise from about 0.005% to about 0.50%, more preferably from about 0.0075% to about 0.40%, still more preferably from about 0.01% to about 0.30%, and most preferably from about 0.01% to about 0.20% non-ionic surfactants.

In a highly preferred embodiment, at least one of the nonionic surfactants used in the present invention is an alkyl polysaccharide. Such preferred surfactants are disclosed in U.S. Pat. Nos. 4,565,647, 5,776,872, 5,883,062, and 5,906, 973. Among alkyl polysaccharides, alkyl polyglycosides comprising five and/or six carbon sugar rings are preferred, those comprising six carbon sugar rings are more preferred, and those wherein the six carbon sugar ring is derived from glucose, i.e., alkyl polyglucosides, are most preferred. The alkyl moieties of the polyglucoside can be derived from fats, oils or chemically produced alcohols; the sugar moieties are derived from hydrolyzed polysaccharides. Alkyl polyglycosides are formed from condensation product of fatty alcohol and sugars like glucose with the number of glucose units defining the relative hydrophilicity. The sugar units can additionally be alkoxylated either before or after reaction with the fatty alcohols. Such alkyl polyglycosides are described in detail in WO 86/05199. Technically, alkyl polyglycosides are generally not molecularly uniform products, but represent mixtures of alkyl groups and mixtures of monosaccharides and different oligosaccharides. The average number of glycoside units is preferably from 1.0 to 2.0, more preferably from 1.2 to 1.8, most preferably from 1.3 to 1.7. Alkyl polyglucosides (also sometimes referred to as "APG's") are especially preferred non-ionics for the purposes of the invention because they are low residue surfactants. The alkyl substituent in the APG chainlength is preferably a saturated or unsaturated alkyl moiety containing from about 8 to about 16 carbon atoms, with an average chainlength of 10 carbon atoms. $C_8$-$C_{16}$ alkyl polyglucosides are commercially available from several suppliers (e.g., Simusol® surfactants from Seppic Corporation, 75 Quai d'Orsay, 75321 Paris, Cedex 7, France, and Glucopon 220®, Glucopon 225®, Glucopon 425®, Plantaren 2000 N®, and Plantaren 2000 N UP®, from Cognis Corporation, Postfach 13 01 64, D 40551, Dusseldorf, Germany).

Another class of non-ionic surfactants suitable for the present invention is alkyl ethoxylates. The alkyl ethoxylates of the present invention are either linear or branched, and contain from 8 carbon atoms to 16 carbon atoms in the hydrophobic tail, and from about 3 ethylene oxide units to about 20 ethylene oxide units in the hydrophilic head group. Examples of alkyl ethoxylates include Neodol 91-6®, Neodol 91-8® supplied by the Shell Corporation (P.O. Box 2463, 1 Shell Plaza, Houston, Tex.), and Alfonic 810-60® supplied by Condea Corporation, (900 Threadneedle P.O. Box 19029, Houston, Tex.). More preferred alkyl ethoxylates comprise from 9 to 12 carbon atoms in the hydrophobic tail, and from about 4 to about 9 ethylene oxide units in the hydrophilic head group. These surfactants offer excellent cleaning benefits and work synergistically with the copolymers of the invention. A most preferred alkyl ethoxylate is $C_{11}EO_5$, available from the Shell Chemical Company under the tradename Neodol 1-5®. Non-ionic ethoxylates can also be derived from branched alcohols. For example, alcohols can be made from branched olefin feedstocks such as propylene or butylene. In a preferred embodiment, the branched alcohol is either a 2-propyl-1-heptyl alcohol or 2-butyl-1-octyl alcohol. A desirable branched alcohol ethoxylate is 2-propyl-1-heptyl EO7, manufactured and sold by BASF Corporation under the tradename Lutensol XP 79.

Another class of non-ionic surfactant suitable for the present invention is amine oxide. Amine oxides, particularly those comprising from 10 carbon atoms to 16 carbon atoms in the hydrophobic tail, are beneficial because of their strong cleaning profile and effectiveness even at levels below 0.10%. Additionally $C_{10\text{-}16}$ amine oxides, especially $C_{12}$-$C_{16}$ amine oxides are excellent solubilizers of perfume. Alternative non-ionic detergent surfactants for use herein are alkoxylated alcohols generally comprising from 8 to 16 carbon atoms in the hydrophobic alkyl chain of the alcohol. Typical alkoxylation groups are propoxy groups or ethoxy groups in combination with propoxy groups, yielding alkyl ethoxy propoxylates. Such compounds are commercially available under the tradename Antarox® available from Rhodia (40 Rue de la Haie-Coq F-93306, Aubervilliers Cédex, France) and under the tradename Nonidet® available from Shell Chemical.

Also suitable for use in the present invention are the fluorinated nonionic surfactants. One particularly suitable fluorinated nonionic surfactant is Fluorad F170 (3M Corporation, 3M Center, St. Paul, Minn., USA). Fluorad F170 has the formula $C_8F_{17}SO_2N(CH_2—CH_3)(CH_2CH_2O)_x$. Also suitable for use in the present invention are silicon-based surfactants. One example of these types of surfactants is Silwet L7604 available from Dow Chemical (1691 N. Swede Road, Midland, Mich., USA).

The condensation products of ethylene oxide with a hydrophobic base formed by the condensation of propylene oxide with propylene glycol are also suitable for use herein. The hydrophobic portion of these compounds will preferably have a molecular weight of from about 1500 to about 1800 and will exhibit water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially available Pluronic® surfactants, marketed by BASF. Chemically, such surfactants have the structure $(EO)_x(PO)_y(EO)_z$ or $(PO)_x(EO)_y(PO)_z$ wherein x, y, and z are from about 1 to about 100, preferably about 3 to about 50. Pluronic® surfactants known to be good wetting surfactants are more preferred. A description of the Pluronic® surfactants, and properties thereof, including wetting properties, can be found in the brochure entitled "BASF Performance Chemicals Plutonic® & Tetronic® Surfactants", available from BASF.

Other suitable though not preferred non-ionic surfactants include the polyethylene oxide condensates of alkyl phenols, e.g., the condensation products of alkyl phenols having an alkyl group containing from 6 to 12 carbon atoms in either a straight chain or branched chain configuration, with ethylene oxide, the said ethylene oxide being present in amounts equal to about 5 to about 25 moles of ethylene oxide per mole of alkyl phenol. The alkyl substituent in such compounds can be derived from oligomerized propylene, diisobutylene, or from other sources of iso-octane n-octane, iso-nonane or n-nonane. Other non-ionic surfactants that can be used include those derived from natural sources such as sugars and include $C_8$-$C_{16}$ N-alkyl glucose amide surfactants.

Zwitterionic surfactants represent a second class of preferred surfactants within the context of the present invention. If present, zwitterionic surfactants comprise from 0.001% to 0.50% by weight of the composition. Preferably, the aqueous compositions comprise from 0.005% to 0.50%, more preferably from 0.0075% to 0.40%, still more preferably from 0.01% to 0.30%, and most preferably from 0.01% to about 0.20% zwitterionic surfactants.

Zwitterionic surfactants contain both cationic and anionic groups on the same molecule over a wide pH range. The typical cationic group is a quaternary ammonium group, although other positively charged groups like sulfonium and phosphonium groups can also be used. The typical anionic groups are carboxylates and sulfonates, preferably sulfonates, although other groups like sulfates, phosphates and the like, can be used. Some common examples of these detergents are described in the patent literature: U.S. Pat. Nos. 2,082,275, 2,702,279 and 2,255,082. A generic formula for some preferred zwitterionic surfactants is:

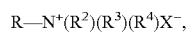

$$R—N^+(R^2)(R^3)(R^4)X^-,$$

wherein R is a hydrophobic group; $R^2$ and $R^3$ are each a $C_1$-$C_4$ alkyl hydroxyl alkyl or other substituted alkyl group which can be joined to form ring structures with the N; $R^4$ is a moiety joining the cationic nitrogen to the hydrophilic anionic group, and is typically an alkylene, hydroxyl alkylene, or polyalkoxyalkylene containing from one to four carbon atoms; and X is the hydrophilic group, most preferably a sulfonate group. Preferred hydrophobic groups R are alkyl groups containing from about 6 to about 20 carbon atoms, preferably less than about 18 carbon atoms. The hydrophobic moieties can optionally contain sites of unsaturation and/or substituents and/or linking groups such as aryl groups, amido groups, ester groups, etc. A specific example of a "simple" zwitterionic surfactant is 3-(N-dodecyl-N,N-dimethyl)-2-hydroxypropane-1-sulfonate (Lauryl hydroxyl sultaine) available from the McIntyre Company (24601 Governors Highway, University Park, Ill. 60466, USA) under the tradename Mackam LHS®. Other specific zwitterionic surfactants have the generic formula:

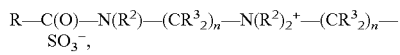
$$R-C(O)-N(R^2)-(CR^3{}_2)_n-N(R^2)_2{}^+-(CR^3{}_2)_n-$$
$$SO_3{}^-,$$

wherein each R is a hydrocarbon, e.g., an alkyl group containing from about 6 to about 20, preferably up to about 18, more preferably up to about 16 carbon atoms, each ($R^2$) is either a hydrogen (when attached to the amido nitrogen), short chain alkyl or substituted alkyl containing from about 1 to about 4 carbon atoms, preferably groups selected from the group consisting of methyl, ethyl, propyl, hydroxyl substituted ethyl and propyl and mixtures thereof, more preferably methyl, each ($R^3$) is selected from the group consisting of hydrogen and hydroxyl groups, and each n is a number from about 1 to about 4, more preferably about 2 or about 3, most preferably about 3, with no more than about 1 hydroxy group in any ($CR^3{}_2$) moiety. The R group can be linear or branched, saturated or unsaturated. The $R^2$ groups can also be connected to form ring structures. A preferred surfactant of this type is a $C_{12-14}$ acylamidopropylene (hydroxypropylene) sulfobetaine that is available from McIntyre under the tradename Mackam 50-SB®. Other very useful zwitterionic surfactants include hydrocarbyl, e.g., fatty alkylene betaines. These surfactants tend to become more cationic as pH is lowered due to protonation of the carboxyl anionic group, and in one embodiment have the generic formula:

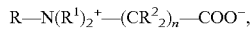
$$R-N(R^1)_2{}^+-(CR^2{}_2)_n-COO^-,$$

wherein R is a hydrocarbon, e.g., an alkyl group containing from 6 to 20, preferably up to 18, more preferably up to 16 carbon atoms, each ($R^1$) is a short chain alkyl or substituted alkyl containing from 1 to 4 carbon atoms, preferably groups selected from the group consisting of methyl, ethyl, propyl, hydroxyl substituted ethyl and propyl, and mixtures thereof, more preferably methyl; ($R^2$) is selected from the group consisting of hydrogen and hydroxyl groups, and n is a number from 1 to 4, preferably 1. A highly preferred low residue surfactant of this type is Empigen BB®, a coco dimethyl betaine produced by Albright & Wilson. In another equally preferred embodiment, the betaine surfactants have the generic formula:

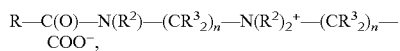
$$R-C(O)-N(R^2)-(CR^3{}_2)_n-N(R^2)_2{}^+-(CR^3{}_2)_n-$$
$$COO^-,$$

wherein each R is a hydrocarbon, e.g., an alkyl group containing from about 6 to about 20, preferably up to about 18, more preferably up to about 16 carbon atoms, each ($R^2$) is either a hydrogen (when attached to the amido nitrogen), short chain alkyl or substituted alkyl containing from about 1 to about 4 carbon atoms, preferably groups selected from the group consisting of methyl, ethyl, propyl, hydroxyl substituted ethyl and propyl and mixtures thereof, more preferably methyl, each ($R^3$) is selected from the group consisting of hydrogen and hydroxyl groups, and each n is a number from about 1 to about 4, more preferably about 2 or about 3, most preferably about 3, with no more than about 1 hydroxy group in any ($CR^3{}_2$) moiety. The R group can be linear or branched, saturated or unsaturated. The $R^2$ groups can also be connected to form ring structures. A highly preferred surfactant of this type is Mackam 35HP®, a coco amido propyl betaine produced by McIntyre.

The third class of preferred surfactants comprises the group consisting of amphoteric surfactants. If present, amphoteric surfactants comprise from 0.001% to 0.50% by weight of the composition. Preferably, the aqueous compositions comprise from 0.005% to 0.50%, more preferably from 0.0075% to about 0.40%, still more preferably from 0.01% to 0.30%, and most preferably from 0.01% to 0.20% amphoteric surfactants. These surfactants function essentially as zwitterionic surfactants at acidic pH. One suitable amphoteric surfactant is a $C_8$-$C_{16}$ amido alkylene glycinate surfactant ('ampho glycinate'). Another suitable amphoteric surfactant is a $C_8$-$C_{16}$ amido alkylene propionate surfactant ('ampho propionate'). These surfactants have the generic structure:

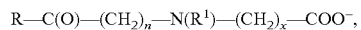
$$R-C(O)-(CH_2)_n-N(R^1)-(CH_2)_x-COO^-,$$

wherein R—C(O)— is a about C5 to about C15, pre hydrophobic fatty acyl moiety, each n is from about 1 to about 3, each R1 is preferably hydrogen or a $C_1$-$C_2$ alkyl or hydroxyalkyl group, and x is about 1 or about 2. Such surfactants are available, in the salt form, from Degussa-Goldschmidt chemical under the tradename Rewoteric AM®. Examples of other suitable low residue surfactants include cocoyl amido ethyleneamine-N-(methyl)acetates, cocoyl amido ethyleneamine-N-(hydroxyethyl)acetates, cocoyl amido propyleneamine-N-(hydroxyethyl) acetates, and analogs and mixtures thereof. Other suitable, amphoteric surfactants are represented by surfactants such as dodecylbeta-alanine, N-alkyltaurines such as the one prepared by reacting dodecylamine with sodium isethionate according to the teaching of U.S. Pat. No. 2,658,072, N-higher alkylaspartic acids such as those produced according to the teaching of U.S. Pat. No. 2,438,091, and the products sold under the trade name "Miranol®", and described in U.S. Pat. No. 2,528,378.

Preferred surfactants are selected from the group consisting of C8-16 alkyl polyglucoside, cocoamido propyl sulfobetaine and mixtures thereof. The weight ratio of copolymer I to nonionic, amphoteric, zwitterionic surfactant or mixtures thereof is between 1:10 and 10:1, more preferably between 1:5 and 5:1.

Surface Stickiness Mitigator

The compositions of the present invention preferably comprise a surface stickiness mitigator. The role of this ingredient is important in order to control the adherent character of copolymer I. The soil-agglomerating copolymer is efficient at adhering soil, and is also equally efficient at 'sticking' itself and the soil to the surface being cleaned. The surface stickiness mitigator reduces the stickiness of the surface being cleaned. While not wishing to be bound by theory, it is believed that the copolymer has a number of sites for adhering soil or surface. The surface stickiness mitigator is believed to obstruct access to these sites, either chemically or via steric hindrance, blocking the sites from interacting with soil or surface. The balance of soil agglomerating copolymer I to surface stickiness mitigator is important. If the level of surface stickiness mitigator is too high, then the ability of the copolymer to adhere soil will be too greatly diminished. Those skilled in the art will appreciate that the level of surface stickiness mitigator in the compositions herein will depend on the specific end use application. For example, stickiness is known to pose a greater concern for floor care applications than does for countertop cleaning applications. Accordingly, the weight ratio of water-soluble or water-dispersible copolymer I to surface stickiness mitigator is variable, and preferably ranges from 10:1 to 1:10, more preferably 5:1 to 1:5.

In addition to the above benefit, it has also been found that when a surface stickiness mitigator is used, copolymer I can be more easily formulates into a phase stable aqueous composition, especially at alkaline pH (pH>7.0). More importantly, the surface stickiness mitigator is found to improve the soil agglomeration properties of copolymer I in alkaline media, leading to improved cleaning efficacy. This is highly beneficial for products such as All-Purpose-Cleaners (APC), kitchen spray cleaners and floor cleaners (including automop based floor cleaners), that are typically formulated at alkaline pH. While not wishing to be limited by theory, it is believed that the surface stickiness mitigator helps prevent hydroxide-mediated precipitation of copolymer I, and additionally helps the cationic groups of copolymer I to remain anchored to the cleaning implement (sponge, cloth, paper towel, premoistened wipe, premoistened disposable pad, substantially dry disposable pad with or without superabsorbent polymer, etc.), used to treat the soiled surface. As a result, the surface stickiness mitigator reduces the propensity for copolymer I to be transferred from the cleaning implement to the surface being cleaned. Lower propensity for copolymer I and associated soils to be redeposited on the treated surface translates into improved surface end result appearance.

Surface stickiness mitigators are chemically charged species. In one embodiment, the surface stickiness mitigator is an alkyl aryl anionic surfactant, preferably selected from linear or branched C10 to C13 benzene, toluene, naphthalene sulfonate and mixtures thereof.

In another preferred embodiment, the surface stickiness mitigator is a zwitterionic polymer. Zwitterionic or. amphoteric copolymers comprise formal positive and negative charged species within the polymeric framework. The zwitterionic copolymers within the context of this invention include homo-polymers comprising betaine and sulfobetaine functionalities. Non limiting examples of such zwitterionic polymers include poly (N,N-dimethyl-N-2-methacroyloxy-ethyl)-N-(3-propane sulfonate) ammonium betaine, 3-(sulfopropyl)acrylate, 3-(sulfopropyl)methacrylate, homopolymers and copolymers derived from, $CH_2=CH-C(O)O-CH_2-CH_2-N(CH_3)_2-CH_2-COO^-$ that are then quaternized with a methylating agent, homopolymers and copolymers derived from $CH_2=CH-C(O)NH-CH_2-CH_2-N(CH_3)_2-CH_2-COO^-$ that then quaternized with methylating agent.

A highly preferred zwitterionic or amphoteric polymer is formed by the copolymerization of two are more monomeric units. One preferred surface stickiness mitigator, copolymer II, is obtained by the copolymerization of monomers containing a quaternary ammonium function and two groups containing ethylenic unsaturation with monomers containing a group capable of ionizing in the application medium to form anionic units, with a ratio of the first monomers to the second monomers which is within a given range. The polymer comprises:

d) at least a monomer compound of general formula II:

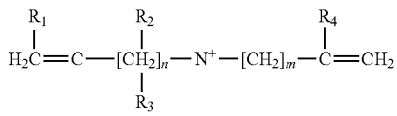

in which,
R1 and R4 independently represent H or a C1-6 linear or branched alkyl group
R2 and R3 independently represent a linear or branched C1-6 alkyl, hydroxyalkyl or aminoalkyl group, preferably a methyl group
n and m are integers of between 1 and 3
X represents a counterion compatible with the water-soluble or water-dispersible nature of the polymer;
e) at least one hydrophilic monomer with an acid functionality that is copolymerisable with monomer d) and capable of ionizing in the medium in which it is used; and f) optionally an ethylenically unsaturated hydrophilic monomer compound of neutral charge bearing one or several hydrophilic groups which is copolymerisable with monomers d) and e); the monomer d) to monomer e) ratio ranging from between 60:40 and 5:95.

More preferably, $R_1$ represents hydrogen, $R_2$ represents methyl, $R_3$ represents methyl, $R_4$ represents hydrogen, and m and n are equal to 1. The ion $X^-$ is preferably chosen from halogen, sulfate, hydrogen sulfate, phosphate, citrate, formate and acetate. The monomer (d) gives the copolymer properties of interaction with agglomerating copolymer I.

The monomer (e) and optionally the monomer (f) give the copolymer hydrophilic properties. The copolymer according to the invention advantageously has a molecular mass of at least 1000, advantageously of at least 10,000; it can be up to 20,000,000, advantageously up to 10,000,000. Except where otherwise indicated, when a molecular mass is mentioned, this will be the weight-average molecular mass, expressed in g/mol. This can be determined by aqueous gel permeation chromatography (GPC) or by measuring the intrinsic viscosity in a 1N $NaNO_3$ solution at 30° C. The copolymer is preferably a random copolymer.

The monomer (d) preferably has the following structure:

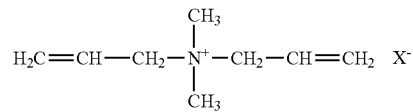

wherein $X^-$ is defined above. One monomer (d) which is particularly preferred is that of the above formula in which $X^-$ represents $Cl^-$, this monomer being known as diallyl dimethyl ammonium chloride or DADMAC.

The monomers (e) are preferably those selected from the group consisting of water-soluble $C_3$-$C_8$ carboxylic, sulfonic, sulfuric, phosphonic or phosphoric acids containing monoethylenic unsaturation, anhydrides thereof and water-soluble salts thereof. Among the preferred monomers (e) are those selected from the group consisting of acrylic acid, methacrylic acid, α-ethacrylic acid, β,β-dimethacrylic acid, methylenemalonic acid, vinylacetic acid, allylacetic acid, ethylideneacetic acid, propylideneacetic acid, crotonic acid, maleic acid, fumaric acid, itaconic acid, citraconic acid, mesaconic acid, N-meth-acryloylalanine, N-acryloylhydroxyglycine, sulfopropyl acrylate, sulfoethyl acrylate, sulfoethyl methacrylate, sulfoethyl methacrylate, styrenesulfonic acid, vinylsulfonic acid, vinylphosphonic acid, phosphoethyl acrylate, phosphonoethyl acrylate, phosphopropyl acrylate, phosphonopropyl acrylate, phosphoethyl methacrylate, phosphonoethyl methacrylate, phosphopropyl methacrylate and phosphonopropyl methacrylate, and the ammonium and alkali metal salts of these acids and mixtures thereof.

Among the monomers (f) are those selected from the group consisting of acrylamide, vinyl alcohol, $C_1$-$C_4$ alkyl esters of acrylic acid and of methacrylic acid, $C_1$-$C_4$ hydroxyalkyl esters of acrylic acid and of methacrylic acid, in particular ethylene glycol and propylene glycol acrylate and methacrylate, polyalkoxylated esters of acrylic acid and of methacrylic acid, in particular the polyethylene glycol and polypropylene glycol esters.

The monomer (d) content is advantageously between 5 mol % and 60 mol %, preferably 20 mol % to 50 mol %. The monomer (e) content is advantageously between 10 mol % and 95 mol %, preferably 20 mol % to 80 mol %. The monomer (f) content is advantageously between 0 mol % and 50 mol %, preferably 5 mol % to 30 mol %. The d:e molar ratio is preferably between 50:50 and 10:90.

The copolymers II of the invention can be obtained according to the known techniques for preparing copolymers, in particular by radical-mediated polymerization of the ethylenically unsaturated starting monomers which are known compounds or which can readily be obtained by a person skilled in the art using conventional synthetic processes of organic chemistry. The radical-mediated polymerization is described in detail earlier with respect to agglomerating copolymer I.

The following copolymers are most particularly preferred: DADMAC/acrylic acid/acrylamide copolymer; DADMAC/maleic acid copolymer; DADMAC/sulfonic acid copolymer; the DADMAC/acidic monomer molar ratio being between 60:40 and 5:95, preferably between 50:50 and 10:90. DADMAC stands for diallyl dimethyl ammonium chloride. Preferred surface stickiness mitigator polymers are available from Rhodia; an alternative is available from Reckitt-Benckiser under the tradename Merquat 280. A particularly preferred polymer II is

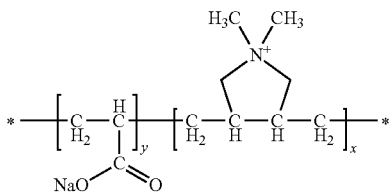

Surfactants comprising alkyl aryl anionics, preferably alkyl aryl sulfonates represent another class of surface stickiness mitigators. Non-limiting examples of alkyl aryl sulfonates include $C_6$-$C_{18}$ linear and branched benzene-, toluene-, xylene- and naphthalene sulfonates. This class of surfactants also includes $C_6$-$C_{18}$ linear or branched alkyl diphenyl ether sulfonates and disulfonates. One particularly preferred class of surfactants is the linear or branched alkyl benzene sulfonates. While not wishing to be limited by theory, it is speculated that the aryl group provides steric hindrance that prevents precipitation of the soil agglomerating copolymer; it is also believed that the surfactant anionic head group, preferably a sulfonate group, provides stickiness mitigation properties by chemically interacting with the cationic moieties of the agglomerating polymer. Anionic surfactants that do not comprise the aryl moiety induce precipitation of copolymer I, especially at alkaline pH (pH>7.0). Thus, linear alkyl sulfonates and sulfates are not suitable to be used with the compositions of the invention.

Optional Composition Ingredients

Organic cleaning solvents: A highly beneficial component of the cleaning solution consists of one or more organic cleaning solvents at effective levels, preferably from 0.15% to 10%, more preferably from 0.20% to 6%, most preferably from 0.25% to 4% by weight of the composition. By organic cleaning solvent, it is meant an agent which assists the removal of soils such as those commonly encountered on commercial and retail floor surfaces. Such solvents typically have a terminal $C_3$-$C_6$ hydrocarbon attached to from one to three ethylene glycol or propylene glycol moieties to provide the appropriate degree of hydrophobicity and, preferably, surface activity. Examples of commercially available organic cleaning solvents based on ethylene glycol chemistry include mono-ethylene glycol n-hexyl ether (Hexyl Cellosolve® available from Dow Chemical). Examples of commercially available organic cleaning solvents based on propylene glycol chemistry include the di-, and tri-propylene glycol derivatives of propyl and butyl alcohol, which are available from Lyondell Corporation, 1221 McKinney St., Houston, Tex. 77010) and Dow Chemical (1691 N. Swede Road, Midland, Mich.) under the trade names Arcosolv® and Dowanol®.

In the context of the present invention, preferred solvents are selected from the group consisting of mono-propylene glycol mono-propyl ether, di-propylene glycol mono-propyl ether, mono-propylene glycol mono-butyl ether, di-propylene glycol mono-propyl ether, di-propylene glycol mono-butyl ether; tri-propylene glycol mono-butyl ether; ethylene glycol mono-butyl ether; di-ethylene glycol mono-butyl ether, ethylene glycol mono-hexyl ether and di-ethylene glycol mono-hexyl ether, and mixtures thereof. "Butyl" includes linear butyl, isobutyl and tertiary butyl groups. Mono-propylene glycol and mono-propylene glycol mono-butyl ether are the most preferred cleaning solvent and are available under the tradenames Dowanol DPnP® and Dowanol DPnB®. Propylene glycol t-butyl ether is commercially available from Lyondell under the tradename Arcosolv PTB®. In a preferred embodiment, the cleaning solvent is purified so as to minimize impurities.

Buffers: Buffers are an important although optional class of adjuncts in this application. Buffers provide acidity or alkalinity as needed, and can help phase stability for the compositions of the invention. Preferably, the compositions of the invention have a pH between 2 and 13, more preferably between 3 and 12, most preferably between 4 and 11. If present, buffers comprise from 0.005% to 0.50%, more preferably from 0.0075% to 0.35%, most preferably from 0.01% to 0.25% by the weight of the composition. An ideal buffer system will maintain pH over a desired narrow range while not leading to streaking/filming issues. Preferred buffers in the context of the invention are those which are highly volatile yet provide cleaning benefits in use. As such, they are advantageous in that they can be used at higher levels than corresponding lower volatility buffers. Volatile buffers have low molecular weight, i.e., less than 160 g/mole and generally contain no more than one hydroxy group. Examples of preferred buffers include ammonia, methanol amine, ethanol amine, 2-amino-2-methyl-1-propanol, 2-dimethylamino-2-methyl-1-propanol, acetic acid, glycolic acid and the like. Most preferred among these are ammonia, 2-amino-2-methyl-1-propanol and acetic acid.

Non-volatile buffers can also be used in this invention, either as stand-alone buffers or in combination with volatile buffers. Non-volatile buffers are generally used at lower levels than volatile buffers because of increased streaking/filming tendencies. Examples of such buffers include, but are not limited to, sodium carbonate, potassium carbonate and bicarbonate, 1,3-bis(aminomethyl)cyclohexane, sodium citrate, citric acid, maleic acid and tartaric acid.

Antimicrobials and preservatives: Preservatives can also be used, and may be required in many of the compositions, especially when the aqueous compositions are used in conjunction with a disposable nonwoven cleaning substrate (vide infra). Examples of preservatives include 2-bromo-2-nitropropane-1,3-diol sold by Inolex Chemical (Jackson and Swanson Streets, Philadelphia, Pa. 19148, USA), hexitidine sold by Dow Chemical. Other preservatives include, 2-((hydroxymethyl) (amino)ethanol, propylene glycol, orthobenzyl-para-chlorophenol sodium hydroxymethyl amino acetate, formaldehyde, glutaraldehyde, sodium pyrithione, zinc pyrithione, 5-chloro-2-methyl-4-isothiazolin-3-one, 2-methyl-4-isothiazolin-3-one, dichloro-s-triazinetrione, trichloro-s-triazinetrione, 1,2-benzisothiazolin-3-one, N-butyl-1,2-benzisothiazolin-3-one, poly (hexamethylene biguanide) hydrochloride, chlorhexidine diacetate and quaternary ammonium compounds. Non-limiting examples of quaternary ammonium compounds to be used as preservatives include dioctyl dimethyl ammonium chloride, didecyl dimethyl ammonium chloride, didecyl dimethyl ammonium bicarbonate, didecyl dimethyl ammonium carbonate $C_{12}$, $C_{14}$ and $C_{16}$ dimethyl benzyl ammonium chloride and associated ring-substituted derivatives. Preferred preservatives include 1,2-benzisothiazolin-3-one (sold by Arch Chemicals), the combination of 2-methyl-4-isothiazolin-3-one and 5-chloro-2-methyl-4-isothiazolin-3-one (sold by Rohm & Haas 100 Independence Mall West, Philadelphia, Pa. under the tradename Kathon GC), and phenoxyethanol (sold by Clariant, 4600 Rue Cousens, VIIIe St. Laurent, Québec CA-H4S 1X3, Canada, under the tradename Phenoxetol), and mixtures thereof. When used, preservatives are preferably present at concentrations of from 0.0001% to 0.05% by weight of the aqueous composition. Many preservatives can provide antibacterial or sanitizer properties on the surfaces when used at higher concentrations. When claimable antimicrobial or sanitizer benefits are desired, the level of active is preferably from 0.05% to 0.50%, more preferably from 0.075% to 0.40% by weight of the composition. Preferred antimicrobial actives for this invention include didecyl dimethyl ammonium chloride, $C_{12}$-$C_{16}$ alkyl dimethyl benzyl ammonium chloride, glutaraldehyde, poly(hexamethylene biguanide) hydrochloride, chlrohexidine diacetate, and mixtures thereof. Preservatives and antimicrobials can be used within the context of the agglomerating copolymers of the present invention without changing the effectiveness of these copolymers. Moreover, the copolymers do not have an adverse effect on the cidal effectiveness properties of the antimicrobial actives.

Chelants: The compositions of the present invention optionally comprise chelants. Chelants are preferably selected from the group consisiting of aminopolycarboxylic acids and salts thereof, wherein the amino group has two or more non-hydrogen substituent groups attached to it. Preferred chelants include the sodium, potassium and ammonium salts of ethylene diamine tetraacetic acid, diethylene triamine pentaacetic acid, N-hydroxyethylenediamine triacetic acid. If present, chelants comprise from 0.005% to 0.15% by weight of the aqueous composition.

Thickening polymers: Low levels of polymer can also be used to thicken the preferred aqueous compositions of the present invention. In general, the level of thickening polymer is kept as low as possible so as not to hinder the product's end result properties. Non-limiting examples of suitable thickening polymers include xanthan gum, guar gum, cationically modified guar gum, and hydroxypropyl methyl cellulose with molecular weight ranging from 10,000 to 5,000,000. Xanthan gum is a particularly preferred thickening agent as it can also enhance end result properties, particularly when used in low concentrations. The thickening polymer agent is present in from about 0.0001% to about 0.05%, more preferably from about 0.0005% to about 0.025%, most preferably from about 0.001% to about 0.015% by weight of the composition.

Suds suppressors: Suds suppressors are well known in the art and generally consist of two types. Linear or branched $C_8$-$C_{22}$ fatty acid soaps, especially $C_{12}$-$C_{18}$ branched fatty acid soaps are effective suds suppressors for the composition of this invention. Silicone suds suppressors are highly preferred. Suitable silicone suds suppressors include any silicone and silica-silicone mixtures. Silicones can be generally represented by alkylated polysiloxane materials while silica is normally used in finely divided forms exemplified by silica aerogels and xerogels and hydrophobic silicas of various types. In industrial practice, the term "silicone" has become a generic term which encompasses a variety of relatively high-molecular-weight polymers containing siloxane units and hydrocarbyl groups of various types. Indeed, silicone compounds have been extensively described in the art, see for instance U.S. Pat. Nos. 4,076,648; 4,021,365; 4,749,740; 4,983,316 and European Patents: EP 150,872; EP 217,501; and EP 499,364, all of said patents being incorporated herein by reference.

Suitable silicone compounds for use herein are commercially available from various companies including Rhodia, GE silicones and Dow Corning. Examples of silicone compounds for use herein are Silicone DB® 100 and Dow Corning AF 1410 Emulsion, commercially available from Dow Corning in Europe and North America, respectively.

Perfumes and dyes: Perfume is an optional, but highly preferred ingredient. As used herein, perfume includes constituent chemical compounds that are combined together primarily for their olfactory contribution. As used herein, 'perfume' include terpene and sesquiterpene compounds and derivatives such as d-limonene and α-pinene that are known to additionally provide additional cleaning efficacy. Perfume components can be natural products such as essential oils, resinoids, resins, concretes, etc., and/or synthetic perfume components such as hydrocarbons, alcohols, aldehydes, ketones, ethers, acids, acetals, ketals, nitriles, and the like, including saturated and unsaturated compounds, aliphatic, carbocyclic and heterocyclic compounds. Examples of such perfume components are: geraniol, geranyl acetate, linalool, linalyl acetate, tetrahydrolinalool, citronellol, citronellyl acetate, dihydromyrcenol, dihydromyrcenyl acetate, terpineol, terpinyl acetate, acetate, 2-phenylethanol, 2-phenylethyl acetate, benzyl alcohol, benzyl acetate, benzyl salicylate, benzyl benzoate, styrallyl acetate, amyl salicylate, dimenthylbenzylcarbinol, trichloromethylphencarbinyl acetate, p-tert.butyl-cyclohexyl acetate, isononyl acetate, alpha-n-amylcinammic aldehyde, alpha-hexyl-cinammic aldehyde, 2-methyl-3-(p-tert.butylphenyl)-propanal, 2-methyl-3(p-isopropylphenyl)propanal, 3-(p-tert.butylphenyl)propanal, tricyclodecenyl acetate, tricyclodecenyl propionate, 4-(4-hydroxy-4-methylpentyl)-3-cyclohexenecarbaldehyde, 4-acetoxy-3-pentyl-tetrahhydropyran, methyl dihydrojasmonate, 2-n-heptyl-cyclopentanone, 3-methyl-2-pentyl-cyclopentanone, n-decanal, n-dodecanal, 9-decenol-1, phenoxyethyl isobutyrate, phenylacetaldehyde dimenthyl acetal, phenylacetaldehyde dicetyll acetal, geranonitrile, citronellonitrile, cedryl acetate, 3-isocamphyl-cyclohexanol, cedryl ether, isolongifolanone, aubepine nitrile, aubepine, heliotropine, coumarin, eugenol, vanillin, diphenyl oxide, hydroxycitronellal, ionones, methyl ionones, isomethyl ionones, irones, cis-3-hexenol and esters thereof, indane musks, tetralin musks, isochroman musks, macrocyclic ketones, macrolactone musks, ethylene brassylate, and aromatic nitromusk. Most hard surface cleaner products contain some perfume to provide an olfactory aesthetic benefit and to cover any "chemical" odor that the product may have. The main function of a small fraction of the highly volatile, low boiling (having low boiling points), perfume components is to improve the fragrance odor of the product itself, rather than impacting on the subsequent odor of the surface being cleaned.

Other Adjuvants: Non-limiting examples of other adjuncts are: enzymes such as proteases, hydrotropes such as sodium toluene sulfonate, sodium cumene sulfonate and potassium xylene sulfonate, and aesthetic-enhancing ingredients such as colorants, providing they do not adversely impact on filming/streaking. The compositions can also comprise one or more colored dyes or pigments. In one embodiment, the compositions of the present invention can comprise disappearing dye, typically a pH indicator indicator from the phtlatlein family that is colored at high pH and becomes colorless as pH drops. Non-limiting examples of disappearing dyes include o-cresolphtalein (purple), phenolphthalein (red) and thymolphtalein (blue). Such disappearing dyes more fully described in WO/9960089, incorporated herein by reference. Dyes, pigments and disappearing dyes, if present, will constitute from 0.1 ppm to 50 ppm by weight of the aqueous composition.

Kits comprising Nonwoven Substrate and Compositions

In a highly preferred embodiment, the present invention also pertains to a kit comprising a nonwoven substrate and a composition comprising agglomerating copolymer I. Preferably the composition is aqueous and also comprises ingredients selected from surfactant, surface stickiness mitigator and mixtures thereof. More preferably the composition comprises copolymer I, surfactant, surface stickiness mitigator and other optional ingredients listed above.

The composition can be pre-loaded onto the substrate to form a premoistened wipe or pad. Alternatively the kit can comprise separate dry substrate and aqueous composition. In the latter execution, the user can apply, preferably via spraying, the composition to the surface to be cleaned and then use the substrate to scrub and absorb the composition and agglomerated soil. Alternatively the composition can be applied directly to the substrate by the user. There are several advantages of using the soil-agglomerating copolymer I in conjunction with a disposable (premoistened or dry) pad/wipe. First, the disposable pad/wipe acts as an anchor for the copolymer, especially if the wipe/pad comprises at least some cellulosic content. While not wishing to be limited by theory, it is believed that ionic interactions (binding of copolymer cationic moieties to negatively charged cellulosic areas of pad/wipe), molecular weight effects (a high molecular weight polymer will anchor better than a low molecular weight polymer) or a combination of ionic and molecular weight interactions cause copolymer I to strongly adhere onto the nonwoven substrate. This limits transfer of the copolymer to the surface to be treated, reducing the need for, or level of, surface stickiness mitigator. The nonwoven substrate also acts as a repository for agglomerated soil, limiting redeposition of soil onto the treated surface. By limiting soil redeposition, the disposable pad and anchored agglomerating copolymer provide improved cleaning of the treated surface. Finally, agglomerated soil bound to copolymer I will blacken (dirty) the cleaning wipe/pad, providing consumers with proof that the product is working and a visual cue as to when to change the used pad. This latter effect from copolymer I is only beneficial if the pad/wipe is intended to be thrown away following limited use (i.e., it is disposable). Darkening of the substrate by agglomeration of particulate soil provides for compelling advertising demonstrations.

Premoistened Wipe and Pad Compositions:

Premoistened wipes and pads of the invention (defined as premoistened wipe laminates for the purpose of this invention) comprise the aqueous composition described in the section above (section I. Aqueous Composition) that comprises copolymer I. Preferably the premoistened wipe composition additionally comprises a surface stickiness mitigator as described hereintofore. Premoistened wipes are ubiquitous in European household cleaners industry and are used for treating hard surfaces, including but not limited to, kitchen countertops and appliances, bathroom sinks, home windows and mirrors, window blinds, exteriors of toilet bowls, living room tables, home floor cleaning including particulate and hair pick-up, car interior and exterior surfaces, eyeglasses, and hard surfaces that require cleaning in industry, for example machinery.

Premoistened wipes can be used by hand for cleaning tasks, or can be attached to or inserted into a handle that limits consumer exposure to the aqueous composition and help provide improved reach. Wipes comprising dry tow fibers are already used in the industry for dusting purposes, for example Swiffer Duster®. Compositions of the present invention include damp/wet dusting compositions optionally comprising tow fibers and preferably comprising some level of hydrophilic fibers. The damp/wet dusting compositions are optionally though preferably used with a handle. The handle can have any length, for example from 15 cm to 1 meter and can be made of any material. Premoistened wipes comprising the agglomerating copolymer of the invention can also be used to remove soils, especially particulate soils that are typically removed by dry dusting sheets and dusters. The compositions can also be used for removal of particulate soils from upholstery and other fabrics including carpet.

The chemical composition of the nonwoven substrate used in this invention can vary from 100% synthetic to 100% non-synthetic fibers. Preferably, the chemical composition of the substrate comprises a blend of synthetic and non-synthetic fibers. More preferably, the synthetic material herein comprises polypropylene, nylon or polyester or blends thereof. Non-synthetic substrates used herein are treated or untreated cellulose fibers that hydrophilic and typically comprise anionic sites. Examples of such fibers include wood pulp, Rayon® and Lyocell®. The composition of the substrate preferably comprises at least 10%, more preferably at least 15%, more preferably at least 20% non-synthetic fibers. Incorporation of cellulosic fibers in the nonwoven substrate advantageously provides an anchor for the agglomerating polymers of the invention via anionic-cationic ionic bonding; this is beneficial because it mitigates the possibility for release of the agglomerating copolymer onto the hard surface to be treated, thereby simultaneously reducing slipperiness and stickiness issues and residue formation.

The distribution of synthetic and non-synthetic fibers within the substrate web can be homogeneous or non-homogeneous. When the distribution of fibers is non-homogeneous, it is preferred that the areas exposed to the hard surface to be treated comprise a higher amount of synthetic fiber than is present in the overall substrate composition. Such a structure keeps a reservoir of fluid within the more absorbent non-synthetic structure, and sandwiched between two areas of the wipe that are more hydrophobic; this results in more controlled release of the aqueous composition and better overall mileage for the wipe. Alternatively, the distribution of fibers can advantageously be made so that only one face of the substrate has more hydrophobic fibers than that of the overall composition. In this case, the substrate would be sided, providing a low friction surface with increased synthetic content, and a second, more draggy surface made of cellulose or treated cellulose derivatives. The presence of increased hydrophobic material at the surface(s) of the substrate also is known to improve the lubricity or glide of the substrate as it is wiped across a variety of hard surfaces. This can provide reassurance of "easier cleaning" for consumers.

According to the present invention, the substrate can be produced by any method known in the art. For example nonwoven material substrates can be formed by dry forming techniques such as air-laying or wet-laying such as on a papermaking machine. Other non-woven manufacturing techniques such as hydroentangling, melt blown, spunbonded, needle punched and methods can also be used.

The substrate preferably has a weight of from 20 gm$^{-2}$ to 200 gm$^{-2}$. More preferably, the substrate has a weight of at least 20 gm$^{-2}$ and more preferably less than 150 gm$^{-2}$; more preferably the basis weight is in the range of 20 gm$^{-2}$ to 110 gm$^{-2}$, more preferably the basis weight is in the range of 20 gm$^{-2}$ to 80 gm$^{-2}$, and most preferably from 25 gm$^{-2}$ to 60 gm$^{-2}$. It is understood that the higher basis weight substrates, from 60 gm$^{-2}$ to 150 gm$^{-2}$, preferably 60 gm$^{-2}$ to 110 gm$^{-2}$ are generally better suited for large job applications such as wet floor, wall and outdoor concrete, patio and house siding cleaning, while the lower basis weight substrates, from 20 gm$^{-2}$ to 80 gm$^{-2}$, more preferably from 25 gm$^{-2}$ to 60 gm$^{-2}$, are generally better suited for smaller cleaning jobs, including wiping of countertops, stove tops, tables, mirrors, windows, appliances, sinks and car interiors. The substrate can have any caliper. Typically, when the substrate is made by hydroentangling, the average substrate caliper is less than about 1.2 mm at a pressure of about 0.1 pounds per square inch. More preferably the average caliper of the substrate is from about 0.1 mm to about 1.0 mm at a pressure of about 0.1 pounds per square inch (about 0.007 kilograms per square meter). The substrate caliper is measured according to standard EDANA nonwoven industry methodology, reference method #30.4-89.

The compositions of the invention can be applied to the substrate at any point after it has been dried. For example the composition can be applied to the substrate prior to calendering or after calendering and prior to being wound up onto a parent roll. Typically, the application will be carried out on a substrate unwound from a roll having a width equal to a substantial number of wipes it is intended to produce. The substrate with the composition applied thereto is then subsequently perforated utilizing standard techniques in order to produce the desired perforation line.

The aqueous compositions of the invention are applied in an amount of from 1.0 gram (g) to 10.0 gram (g) per gram (g) of dry substrate (i.e., load factor=1× to 10×), preferably from 1.25 g to 8.5 g per g of dry substrate, most preferably from 1.5 g to 7.0 g per g of dry substrate. In one embodiment, a low basis weight monolayer substrate, from 20 gm$^{-2}$ to 55 gm$^{-2}$, more preferably from 30 gm$^{-2}$ to 45 gm$^{-2}$, is impregnated with an aqueous composition comprising copolymer I at load factor of from 1.0 g to 2.5 g per g of dry substrate; in such a scenario, cleaning is achieved via damp dusting of surfaces. A commercially available example of this type composition and application is Swiffer Shine® sold in Europe.

In another preferred embodiment, a relatively low basis weight monolayer substrate, from 30 gm$^{-2}$ to 80 gm$^{-2}$, preferably 30 gm$^{-2}$ to 80 gm$^{-2}$, is used in making a premoistened wipe suitable for cleaning counters, stove tops, kitchen cabinetry, mirrors, windows, walls, sinks and the like. For such end use applications, the dry substrate is loaded with an aqueous composition of the invention at a factor of from 1.5 g to 6 g per g, more preferably from 2 g to 5 g per g of dry substrate.

In another embodiment, an aqueous composition comprising copolymer I is impregnated into fibers that make up a damp or wet duster for cleaning of dust, particulates, cob webs etc. The damp or wet duster preferably comprises hydrophilic fibers, especially low or attached (wet laid or air laid hydrophilic fibers that partition the duster fibrous content into two halves and onto which a handle can be inserted. The damp or wet duster preferably comprises hydrophilic fibers, preferably selected from pulp, Rayon®, Lyocell®, Tencel®, cellulose acetate and mixtures thereof. The hydrophilic fibers can include mixtures of synthetic and non-synthetic fibers provided that at least 50% of the fibers are non-synthetic. These fibers can optionally be used fringe fibers for the duster. The duster can optionally comprise tow fibers to provide additional mileage duster benefits for the damp or wet duster once the aqueous composition on the duster begins to get used up. Hydrophilic and synthetic fibers can be in the form of separate layers within the damp or wet duster or can be randomized together. The basis weight of the hydrophilic fibers is preferably from 20 gm$^{-2}$ to 60 gm$^{-2}$, more preferably from 30 gm$^{-2}$ to 45 gm$^{-2}$; the basis weight of the tow fibers is preferably from 50 gm$^{-2}$ to 150 gm$^{-2}$, more preferably from 60 gm$^{-2}$ to 130 gm$^{-2}$, most preferably from 75 gm$^{-2}$ to 125 gm$^{-2}$. The damp or wet duster can be loaded with a composition comprising copolymer I at a load factor of 1.5 g to 6 g per g, more preferably from 2 g to 5 g per g of dry substrate.

In another preferred embodiment, a higher basis weight substrate, from 60 gm$^{-2}$ to 200 gm$^{-2}$, more preferably from 60 gm$^{-2}$ to 110 gm$^{-2}$, is used in the making of the premoistened wipe suitable for cleaning larger area surfaces, such as floors, walls, house siding, garages, and the like. In that case, the wipe is preferably sold with, or designed to work with, a hand held implement comprising a handle and cleaning head. For such end use applications, the dry substrate is loaded with an aqueous composition of the invention at a factor of from 3 g to 10 g per g of dry substrate, more preferably from 4 g to 8 g per g of dry substrate.

In a highly preferred embodiment, the substrate is a premoistened cleaning pad comprising a floor layer that is in contact with the hard surface to be treated, a liquid reservoir layer (core) in contact with the floor layer and an optional topsheet. An example of such a cleaning pad is Swiffer Wet®, manufactured and sold by the Procter & Gamble Company. It is preferred that the floor layer contain at least 20%, more preferably at least 30%, most preferably at least 40% synthetic fibers for oily soil removal and glide on floors. The floor layer can consist of two or more sub-layers, each with different function. For example, Nylon® fibers can be used along the edge of principal floor sheet for improved scrubbing ability on the contacted surface. The reservoir layer, which preferably has physical contact with the floor layer but not the surface to be treated, comprises mainly pulp or paper-derived fibers and acts as a fluid reservoir and dispensing unit to the floor sheet. This fluid reservoir layer can actually consist of two or more sub-layers of similar or differing physical and chemical properties. In one embodiment, a higher density core is sandwiched between the floor sheet and a lower density core. This configuration allows for improved metering of fluid from the pad to the surface to be treated. Preferably, the fluid reservoir layer has a basis weight of from 90 gm$^{-2}$ to 300 gm$^{-2}$, more preferably from 100 gm$^{-2}$ to about 200 gm$^{-2}$, most preferably from 100 gm$^{-2}$ to about 150 gm$^{-2}$. Where two or more sub-layers are combined to form the reservoir layer, each sub-layer preferably has a basis weight of from 40 gm$^{-2}$ to 150 gm$^{-2}$, more preferably from 50 gm$^{-2}$ to about 100 gm$^{-2}$. Preferably, the fluid reservoir layer is made by the airlaid process and comprises predominantly cellulosic and bicomponent fibers (thermoplastic fibers that comprise a core fiber made from one polymer, typically polypropylene; that is encased within a thermoplastic sheath made from a different polymer (typically polyethylene); the ratio of cellulosic to bicomponent fibers is preferably at least 3 to 1, more preferably at least 4 to 1, most preferably at least 5 to 1. Other layers can optionally be included to help fluid dosing purposes or, for attachment purposes. The attachment layer, if present, can be made of synthetic fibers, cellulosic fibers, or blends of synthetic and cellulosic fibers. The aqueous chemistry fluid load factor will largely depend upon the fiber density and basis weight of the reservoir core, with higher load factors enabled by lower fiber densities and higher substrate basis weights. However, the overall substrate solution load factor is preferably from 5 grams solution per gram of the dry weight substrate pad to about 15 grams solution per gram of the dry weight of the pad, more preferably from 5 grams solution per gram dry weight substrate pad to 10 grams solution per dry weight pad.

The pads can have any caliper though it preferred that the reservoir layer have the highest caliper within the overall laminate. The arrangement of the pad layers with respect to each other and to the cleaning implement can be varied significantly as desired by the product designer. For example, either the floor sheet or the optional top sheet can function as the attachment layer to the implement (design 1 with a wider floor sheet, design 2 with a wider top sheet).

Kit Comprising a Dry Cleaning Pad and Aqueous Composition with Copolymer I:

In another preferred embodiment, a kit is provided comprising dry (or dry to the touch) cleaning pads and separate aqueous chemistry described in section I that further comprises soil-agglomerating copolymer I. The dry cleaning pad can be a dry duster (with or without optional handle), a laminate of nonwoven substrates without superabsorbent polymer or a laminate of substrates comprising superabsorbent polymer. The aqueous chemistry can be housed in any suitable container and can be applied onto the surface to be treated by any means known in the art. For example, application of solution can be achieved via a separate squirt bottle, aerosol can or spray trigger system. Alternatively, the aqueous chemistry container can also be housed in a container directly attached to, or built into the cleaning device (i.e., on the mop head or the handle). The delivery mechanism can be then actuated by the operator, or can be battery-induced or electrical.

The cleaning pad is preferably absorbent. An example of a commercially available suitable absorbent pad is the pad in the kit sold under the tradename Clorox Ready Mop®. In a preferred embodiment, the absorbent pad additionally comprises superabsorbent material. Superabsorbent materials are especially beneficial with the compositions of the present invention because they help keep the floor side of the pad free of aqueous cleaning composition, reducing the amount of soil-agglomerating polymer I left behind after mopping. This simultaneously mitigates surface stickiness and keeps the floor substantially residue-free.

The cleaning pads preferably have an absorbent capacity, when measured under a confining pressure of 0.09 psi (psi=pounds per square inch) after 20 minutes (1200 seconds) (hereafter referred to as "$t_{1200}$ absorbent capacity"), of at least about 10 g deionized water per g of the cleaning pad. The absorbent capacity of the pad is measured at 20 minutes (1200 seconds) after exposure to deionized water, as this represents a typical time for the consumer to clean a hard surface such as a floor. The confining pressure represents typical pressures exerted on the pad during the cleaning process. As such, the cleaning pad should be capable of absorbing significant amounts of the cleaning solution within this 1200 second period at 0.09 psi pressure. The cleaning pad will preferably have a $t_{1200}$ absorbent capacity of at least about 15 g/g, more preferably at least about 20 g/g, still more preferably at least about 25 g/g and most preferably at least about 30 g/g. The cleaning pad will preferably have a $t_{900}$ absorbent capacity of at least about 10 g/g, more preferably a $t_{900}$ absorbent capacity of at least about 20 g/g. Values for $t_{1200}$ and $t_{900}$ absorbent capacity are measured by the performance under pressure (referred to herein as "PUP") method, which is described in detail in the Test Methods section in U.S. Pat. No. 6,045,622, said application being incorporated herein, in its entirety, by reference. The application contains a more complete disclosure of the pads, instruments, etc. that are of use herein.

The cleaning pads will also preferably, but not necessarily, have a total fluid capacity (of deionized water) of at least about 50 g, more preferably at least about 75 g, still more preferably at least about 100 g and most preferably at least about 200 g. In the pads there is preferably an absorbent layer which serves to retain any fluid and soil absorbed by the cleaning pad during use. While the preferred scrubbing layer, described hereinafter, has some effect on the pad's ability to absorb fluid, the preferred absorbent layer plays a major role in achieving the desired overall absorbency. Furthermore, the absorbent layer preferably comprises multiple layers which are designed to provide the cleaning pad with multiple planar surfaces.

From the essential fluid absorbency perspective, the absorbent layer is preferably capable of removing fluid and soil from any "scrubbing layer" so that the scrubbing layer will have capacity to continually remove soil from the surface. The absorbent layer also is preferably capable of retaining absorbed material under typical in-use pressures to avoid "squeeze-out" of absorbed soil and soil agglomerating solution.

The absorbent layer can comprise any material that is capable of absorbing and retaining fluid during use. To achieve desired total fluid capacities, it will be preferred to include in the absorbent layer a material having a relatively high fluid capacity (in terms of grams of fluid per gram of absorbent material). Because a majority of the cleaning fluids useful with the present invention are aqueous based, it is preferred that the superabsorbent materials have a relatively high g/g capacity for water or water-based fluids. Representative superabsorbent materials include water insoluble, water-swellable superabsorbent gelling polymers (referred to herein as "superabsorbent gelling polymers") which are well known in the literature. The use of superabsorbent gelling polymers in fibrous form provides the benefit of providing enhanced retention of the superabsorbent material, relative to particles, during the cleaning process. While their capacity is generally lower for aqueous-based mixtures, these materials still demonstrate significant absorbent capacity for such mixtures. The patent literature is replete with disclosures of water-swellable materials. See, for example, U.S. Pat. No. 3,699,103 (Harper et al.), issued Jun. 13, 1972; U.S. Pat. No. 3,770,731 (Harmon), issued Jun. 20, 1972; U.S. Reissue patent 32,649 (Brandt et al.), reissued Apr. 19, 1989; U.S. Pat. No. 4,834,735 (Alemany et al.), issued May 30, 1989.

Superabsorbent gelling polymers useful in the present invention include a variety of water-insoluble, but water-swellable polymers capable of absorbing large quantities of fluids. Such polymeric materials are also commonly referred to as "hydrocolloids", and can include polysaccharides such as carboxymethyl starch, carboxymethyl cellulose, and hydroxypropyl cellulose; nonionic types such as polyvinyl alcohol, and polyvinyl ethers; cationic types such as polyvinyl pyridine, polyvinyl morpholine, and N,N-dimethylaminoethyl or N,N-diethylaminopropyl acrylates and methacrylates, and the respective quaternary salts thereof. Well-known materials and are described in greater detail, for example, in U.S. Pat. No. 4,076,663 (Masuda et al), issued Feb. 28, 1978, and in U.S. Pat. No. 4,062,817 (Westerman), issued Dec. 13, 1977, both of which are incorporated by reference. Preferred superabsorbent gelling polymers contain carboxy groups. These polymers include hydrolyzed starch-acrylonitrile graft copolymers, partially neutralized hydrolyzed starch-acrylonitrile graft copolymers, starch-acrylic acid graft copolymers, partially neutralized starch-acrylic acid graft copolymers, saponified vinyl acetate-acrylic ester copolymers, hydrolyzed acrylonitrile or acrylamide copolymers, slightly network crosslinked polymers of any of the foregoing copolymers, partially neutralized polyacrylic acid, and slightly network crosslinked polymers of partially neutralized polyacrylic acid. These polymers can be used either solely or in the form of a mixture of two or more different polymers. Examples of these polymer materials are disclosed in U.S. Pat. Nos. 3,661,875, 4,076,663, 4,093,776, 4,666,983, and 4,734,478, all of said patents being incorporated by reference. Most preferred polymer materials for use in making the superabsorbent gelling polymers are slightly network crosslinked polymers of partially neutralized polyacrylic acids and starch derivatives thereof. Most preferably, the hydrogel-forming absorbent polymers comprise from about 50 to about 95%, preferably about 75%, neutralized, slightly network crosslinked, polyacrylic acid (i.e. poly (sodium acrylate/acrylic acid)). Network crosslinking renders the polymer substantially water-insoluble and, in part, determines the absorptive capacity and extractable polymer content characteristics of the superabsorbent gelling polymers. Processes for network crosslinking these polymers and typical network crosslinking agents are described in greater detail in U.S. Pat. No. 4,076,663. While the superabsorbent gelling polymers is preferably of one type (i.e., homogeneous), mixtures of polymers can also be used in the implements of the present invention. For example, mixtures of starch-acrylic acid graft copolymers and slightly network crosslinked polymers of partially neutralized polyacrylic acid can be used in the present invention.

While any of the superabsorbent gelling polymers described in the prior art can be useful in the present invention, where significant levels (e.g., more than about 50% by weight of the absorbent structure) of superabsorbent gelling polymers are to be included in an absorbent structure, and in particular where one or more regions of the absorbent layer will comprise more than about 50%, by weight of the region, the problem of gel blocking by the swollen particles can impede fluid flow and thereby adversely affect the ability of the gelling polymers to absorb to their full capacity in the desired period of time. U.S. Pat. No. 5,147,343 (Kellenberger et al.), issued Sep. 15, 1992 and U.S. Pat. No. 5,149,335 (Kellenberger et al.), issued Sep. 22, 1992, describe superabsorbent gelling polymers in terms of their Absorbency Under Load (AUL), where gelling polymers absorb fluid (0.9% saline) under a confining pressure of 0.3 psi. (The disclosure of each of these patents is incorporated herein by reference.) The methods for determining AUL are described in these patents. Polymers described therein can be particularly useful in embodiments of the present invention that contain regions of relatively high levels of superabsorbent gelling polymers. In particular, where high concentrations of superabsorbent gelling polymer are incorporated in the cleaning pad, those polymers will preferably have an AUL, measured according to the methods described in U.S. Pat. No. 5,147,343, of at least about 24 ml/g, more preferably at least about 27 ml/g after 1 hour; or an AUL, measured according to the methods described in U.S. Pat. No. 5,149,335, of at least about 15 ml/g, more preferably at least about 18 ml/g after 15 minutes. Commonly assigned U.S. application Ser. Nos. 08/219,547 (Goldman et al.), filed Mar. 29, 1994 and 08/416,396 (Goldman et al.), filed Apr. 6, 1995 (both of which are incorporated by reference herein), also address the problem of gel blocking and describe superabsorbent gelling polymers useful in overcoming this phenomena. These applications specifically describe superabsorbent gelling polymers which avoid gel blocking at even higher confining pressures, specifically 0.7 psi. In the embodiments of the present invention where the absorbent layer will contain regions comprising high levels (e.g., more than about 50% by weight of the region) of superabsorbent gelling polymer, it can be preferred that the superabsorbent gelling polymer be as described in the aforementioned applications by Goldman et al.

Where superabsorbent material is included in the absorbent layer, the absorbent layer will preferably comprise at least about 15%, by weight of the absorbent layer, more preferably at least about 20%, still more preferably at least about 25%, of the superabsorbent material. The absorbent layer can also consist of or comprise fibrous material. Fibers useful in the present invention include those that are naturally occurring (modified or unmodified), as well as synthetically made fibers. Examples of suitable unmodified/modified naturally occurring fibers include cotton, Esparto grass, bagasse, hemp, flax, silk, wool, wood pulp, chemically modified wood pulp, jute, ethyl cellulose, and cellulose acetate. Suitable synthetic fibers can be made from polyvinyl chloride, polyvinyl fluoride, polytetrafluoroethylene, polyvinylidene chloride, polyacrylics such as ORLON®, polyvinyl acetate, polyethylvinyl acetate, non-soluble or soluble polyvinyl alcohol, polyolefins such as polyethylene (e.g., PULPEX®) and polypropylene, polyamides such as nylon, polyesters such as DACRON® or KODEL®, polyurethanes, polystyrenes, and the like. The absorbent layer can comprise solely naturally occurring fibers, solely synthetic fibers, or any compatible combination of naturally occurring and synthetic fibers.

The fibers useful herein can be hydrophilic, hydrophobic or can be a combination of both hydrophilic and hydrophobic fibers. As indicated above, the particular selection of hydrophilic or hydrophobic fibers depends upon the other materials included in the absorbent (and to some degree the scrubbing) layer. That is, the nature of the fibers will be such that the cleaning pad exhibits the necessary fluid delay and overall fluid absorbency. Suitable hydrophilic fibers for use in the present invention include cellulosic fibers, modified cellulosic fibers, rayon, polyester fibers such as hydrophilic nylon (HYDROFIL®). Suitable hydrophilic fibers can also be obtained by hydrophilizing hydrophobic fibers, such as surfactant-treated or silica-treated thermoplastic fibers derived from, for example, polyolefins such as polyethylene or polypropylene, polyacrylics, polyamides, polystyrenes, polyurethanes and the like.

Suitable wood pulp fibers can be obtained from well-known chemical processes such as the Kraft and sulfite processes. It is especially preferred to derive these wood pulp fibers from southern soft woods due to their premium absorbency characteristics. These wood pulp fibers can also be obtained from mechanical processes, such as ground wood, refiner mechanical, thermomechanical, chemi-mechanical, and chemi-thermomechanical pulp processes. Recycled or secondary wood pulp fibers, as well as bleached and unbleached wood pulp fibers, can be used. Where fibers are used as the absorbent layer (or a constituent component thereof), the fibers can optionally be combined with a thermoplastic material. Upon melting, at least a portion of this thermoplastic material migrates to the intersections of the fibers, typically due to interfiber capillary gradients. These intersections become bond sites for the thermoplastic material. When cooled, the thermoplastic materials at these intersections solidify to form the bond sites that hold the matrix or web of fibers together in each of the respective layers. This can be beneficial in providing additional overall integrity to the cleaning pad.

Amongst its various effects, bonding at the fiber intersections increases the overall compressive modulus and strength of the resulting thermally bonded member. In the case of the chemically stiffened cellulosic fibers, the melting and migration of the thermoplastic material also has the effect of increasing the average pore size of the resultant web, while maintaining the density and basis weight of the web as originally formed. This can improve the fluid acquisition properties of the thermally bonded web upon initial exposure to fluid, due to improved fluid permeability, and upon subsequent exposure, due to the combined ability of the stiffened fibers to retain their stiffness upon wetting and the ability of the thermoplastic material to remain bonded at the fiber intersections upon wetting and upon wet compression. In net, thermally bonded webs of stiffened fibers retain their original overall volume, but with the volumetric regions previously occupied by the thermoplastic material becoming open to thus increase the average interfiber capillary pore size.

Thermoplastic materials useful in the present invention can be in any of a variety of forms including particulates, fibers, or combinations of particulates and fibers. Thermoplastic fibers are a particularly preferred form because of their ability to form numerous interfiber bond sites. Suitable thermoplastic materials can be made from any thermoplastic polymer that can be melted at temperatures that will not extensively damage the fibers that comprise the primary web or matrix of each layer. Preferably, the melting point of this thermoplastic material will be less than about 190° C., and preferably between 75° C. and 175° C. In any event, the melting point of this thermoplastic material should be no lower than the temperature at which the thermally bonded absorbent structures, when used in the cleaning pads, are likely to be stored. The melting point of the thermoplastic material is typically no lower than about 50° C.

The thermoplastic materials, and in particular the thermoplastic fibers, can be made from a variety of thermoplastic polymers, including polyolefins such as polyethylene (e.g., PULPEX®) and polypropylene, polyesters, copolyesters, polyvinyl acetate, polyethylvinyl acetate, polyvinyl chloride, polyvinylidene chloride, polyacrylics, polyamides, copolyamides, polystyrenes, polyurethanes and copolymers of any of the foregoing such as vinyl chloride/vinyl acetate, and the like. Depending upon the desired characteristics for the resulting thermally bonded absorbent member, suitable thermoplastic materials include hydrophobic fibers that have been made hydrophilic, such as surfactant-treated or silica-treated thermoplastic fibers derived from, for example, polyolefins such as polyethylene or polypropylene, polyacrylics, polyamides, polystyrenes, polyurethanes and the like. The surface of the hydrophobic thermoplastic fiber can be rendered hydrophilic by treatment with a surfactant, such as a nonionic or anionic surfactant, e.g., by spraying the fiber with a surfactant, by dipping the fiber into a surfactant or by including the surfactant as part of the polymer melt in producing the thermoplastic fiber. Upon melting and resolidification, the surfactant will tend to remain at the surfaces of the thermoplastic fiber. Suitable surfactants include nonionic surfactants such as Brij® 76 manufactured by ICI Americas, Inc. of Wilmington, Del., and various surfactants sold under the Pegosperse® trademark by Glyco Chemical, Inc. of Greenwich, Conn. Besides nonionic surfactants, anionic surfactants can also be used. These surfactants can be applied to the thermoplastic fibers at levels of, for example, from about 0.2 to about 1 g. per sq. of centimeter of thermoplastic fiber. Suitable thermoplastic fibers can be made from a single polymer (monocomponent fibers), or can be made from more than one polymer (e.g., bicomponent fibers). As used herein, "bicomponent fibers" refers to thermoplastic fibers that comprise a core fiber made from one polymer that is encased within a thermoplastic sheath made from a different polymer. The polymer comprising the sheath often melts at a different, typically lower, temperature than the polymer comprising the core. As a result, these bicomponent fibers provide thermal bonding due to melting of the sheath polymer, while retaining the desirable strength characteristics of the core polymer. Suitable bicomponent fibers for use in the present invention can include sheath/core fibers having the following polymer combinations: polyethylene/polypropylene, polyethylvinyl acetate/polypropylene, polyethylene/polyester, polypropylene/polyester, copolyester/polyester, and the like. Particularly suitable bicomponent thermoplastic fibers for use herein are those having a polypropylene or polyester core, and a lower melting copolyester, polyethylvinyl acetate or polyethylene sheath (e.g., those available from Danaklon a/s, Chisso Corp., and CELBOND®, available from Hercules). These bicomponent fibers can be concentric or eccentric. As used herein, the terms "concentric" and "eccentric" refer to whether the sheath has a thickness that is even, or uneven, through the cross-sectional area of the bicomponent fiber. Eccentric bicomponent fibers can be desirable in providing more compressive strength at lower fiber thicknesses.

The absorbent layer of the cleaning pad can be comprised of a homogeneous material, such as a blend of cellulosic fibers (optionally thermally bonded) and swellable superabsorbent gelling polymer. Alternatively, the absorbent layer can be comprised of discrete layers of material, such as a layer of thermally bonded airlaid material and a discrete layer of a superabsorbent material. For example, a thermally bonded layer of cellulosic fibers can be located lower than (i.e., beneath) the superabsorbent material (i.e., between the superabsorbent material and the scrubbing layer). In order to achieve high absorptive capacity and retention of fluids under pressure, while at the same time providing initial delay in fluid uptake, it can be preferable to utilize such discrete layers when forming the absorbent layer. In this regard, the superabsorbent material can be located remote from the scrubbing layer by including a less absorbent layer as the lower-most aspect of the absorbent layer. For example, a layer of cellulosic fibers can be located lower (i.e., beneath) than the superabsorbent material (i.e., between the superabsorbent material and the scrubbing layer).

In a preferred embodiment, the absorbent layer comprises a thermally bonded airlaid web of cellulose fibers (Flint River, available from Weyerhaeuser, Wa) and AL Thermal C (thermoplastic available from Danaklon a/s, Varde, Denmark), and a swellable hydrogel-forming superabsorbent polymer. The superabsorbent polymer is preferably incorporated such that a discrete layer is located near the surface of the absorbent layer which is remote from the scrubbing layer. Preferably, a thin layer of, e.g., cellulose fibers (optionally thermally bonded) are positioned above the superabsorbent gelling polymer to enhance containment.

The scrubbing layer is the portion of the cleaning pad that contacts the soiled surface during cleaning. As such, materials useful as the scrubbing layer must be sufficiently durable that the layer will retain its integrity during the cleaning process. In addition, when the cleaning pad is used in combination with a solution, the scrubbing layer must be capable of absorbing liquids and soils, and relinquishing those liquids and soils to the absorbent layer. This will ensure that the scrubbing layer will continually be able to remove additional material from the surface being cleaned. Whether the implement is used with a cleaning solution (i.e., in the wet state) or without cleaning solution (i.e., in the dry state), the scrubbing layer will, in addition to removing particulate matter, facilitate other functions, such as polishing, dusting, and buffing the surface being cleaned.

The scrubbing layer can be a mono-layer, or a multi-layer structure one or more of whose layers can be slitted to facilitate the scrubbing of the soiled surface and the uptake of particulate matter. This scrubbing layer, as it passes over the soiled surface, interacts with the soil (and cleaning solution when used), loosening and emulsifying tough soils and permitting them to pass freely into the absorbent layer of the pad. The scrubbing layer preferably contains openings (e.g., slits) that provide an easy avenue for larger particulate soil to move freely in and become entrapped within the absorbent layer of the pad. Low density structures are preferred for use as the scrubbing layer, to facilitate transport of particulate matter to the pad's absorbent layer. In order to provide desired integrity, materials particularly suitable for the scrubbing layer include synthetics such as polyolefins (e.g., polyethylene and polypropylene), polyesters, polyamides, synthetic cellulosics (e.g., Rayon®), and blends thereof. Such synthetic materials can be manufactured using known process such as carded, spunbond, meltblown, airlaid, needle punched and the like.

Cleaning pads of the present invention optionally have an attachment layer that allows the pad to be connected to an implement's handle or the support head in preferred implements. The attachment layer will be necessary in those embodiments where the absorbent layer is not suitable for attaching the pad to the support head of the handle. The attachment layer can also function as a means to prevent fluid flow through the top surface (i.e., the handle-contacting surface) of the cleaning pad, and can further provide enhanced integrity of the pad. As with the scrubbing and absorbent layers, the attachment layer can consist of a mono-layer or a multi-layer structure, so long as it meets the above requirements. The attachment layer can comprise a surface which is capable of being mechanically attached to the handle's support head by use of known hook and loop technology. In such an embodiment, the attachment layer will comprise at least one surface which is mechanically attachable to hooks that are permanently affixed to the bottom surface of the handle's support head.

The present invention includes processes for cleaning a surface, preferably a hard surface, comprising the step of contacting, preferably wiping, said surface using an aqueous composition comprising copolymer I and preferably a surface stickiness mitigator. For floor cleaning, the compositions can be used in conjunction with conventional mop/cloth and bucket type cleaning systems. These include sponge, string and strip mops. Alternatively, the floor cleaning process can be accomplished using a disposable premoistened wipe or pad comprising an aqueous composition comprising copolymer I. Examples of such systems include Pledge Wet® and Swifer Wet®. In yet another embodiment, the cleaning process is accomplished using a kit comprising a cleaning implement, dry cleaning pads that are fitted to the cleaning implement, and an aqueous composition comprising copolymer I. Examples of such a system include Clorox Ready Mop® and Swiffer Wet Jet® (for Wet Jet® the disposable dry pads also comprises superabsorbent polymer). The process for cleaning in each case consists of wetting the floor thoroughly with the aqueous composition. A preferred wiping pattern consists of an up-and-down overlapping motion starting in the bottom left hand (or right hand) side of the section to be cleaned, and continuing the wiping pattern across the floor continuing to use up-and-down wiping motions. Wiping is then continued beginning at the top right (or left) side of the section to be cleaned and reversing the direction of the wipe pattern using a side-to-side motion. Another preferred wipe pattern consists of an up-and-down wiping motion, followed by an up-and-down wiping motion in the reverse direction. All preferred wiping patterns above can be conveyed to the consumer via instructions for use listed in the kit or package artwork.

For cleaning of smaller sized hard surfaces, including, but not limited to, tiles, windows, window and door blinds and shades, sinks, showers, car interiors, vanities, wall areas, countertops, appliances and tables, the compositions are preferably used in the form of a ready-to-use spray bottle or aerosol can. Accordingly, the composition comprising the copolymer of the invention is contacted with the surface to be treated and then spread and wiped up by means of a cleaning implement. Examples of cleaning implements in this context include cotton cloths, sponges, paper towels and chamois. Alternatively, the composition comprising copolymer I can be incorporated into a premoistened wipe or pad. In such a case, the premoistened wipe or pad is wiped on the surface to be cleaned and across the soiled area(s), preferably using side-to-side wiping motions. Removal of the soil is visually evident because of visible soil agglomeration on the wipe.

Test Methodology

The soil-agglomerating benefits of copolymer I are measured via a three-tile test described below using Wet Jet pads and aqueous compositions of the invention. Black CeramiCraft brand ceramic tiles with matte finish made in France by Marazzi, and with dimensions of 30 cm×30 cm×0.5 cm are used in the cleaning tests. The tiles were purchased in the USA from Carpetland in Woodlawn, Ohio. Prior to any experimental testing, the tiles are first cleaned with a 50/50 mixture of 2-propanol and deionized water and allowed to air dry.

Wet Jet® Pads:

Pads used are those commercially available in the US as "Swiffer Wet Jet®". For the purposes of the test pads are cut down to a dimension of 11.5×14.5 cm along the width of the pad in order to scale it down so it can effectively be used to clean the 20 cm×20 cm×1 cm Black CeramiCraft brand ceramic tiles described above. After cutting the edges, the pad is sealed with two-sided tape to prevent super-absorbent polymer from leaching out. The pad is then attached to a handle with a mop head. The implement head can be made using an implement such as that sold as "Swiffer®", taking the head portion only and cutting it down to 10.5×11.5 cm (thus creating a mini implement to go with the reduced size pads used in the experiments). The pad can be attached with tape onto the Swiffer® mini implement or with Velcro®.

Wet Jet® Testing Procedure:

Prior to wiping the flaps on mini Wet Jet® pad are opened as per usage instructions. Each test solution is wiped on three tiles in succession using the same mini Wet Jet pad. Tile #1 is unsoiled. Tile #2 has soil consisting essentially of 80% particulate inorganic matter and 20% lightly polymerized soybean oil. The soil is suspended in a low boiling solvent mix and rolled evenly onto the clean test tile (~2 grams soil solution on tile #2). When dry, the tiles contain approximately 300 mg soil residue. Tile #3, is also unsoiled. The test consists of wiping tile #1, #2 and #3 in succession wherein each 2 mls of solution is applied to each tile. Accordingly, tile #1 provides a measure for filming/streaking (hereinafter F/S) properties of the pad and associated test solution, tile #2 provides a measure of cleaning efficacy of the pad and test solution, and tile #3 provides a measure of the redeposition of soil from the pad.

Wet Jet® Wiping Process & Grading:

The Wet Jet mini-pad is first primed with 1 ml of test solution on a separate tile. Then two additional mls of the same test solution are applied at the bottom of the first tile (3 mm above edge of bottom) using a pipette and spread along the full width of the tile trying to achieve even coverage. The implement comprising the mini Wet Jet® pad is then placed over the solution at the bottom left hand corner of the tiles, and then made to wipe the complete surface of the test tiles in four un-interrupted over-lapping up-and-down wipe motions. The wipe motions are first made from left to right (up-and-down four times), then repeated right to left (up-and-down four times). The wiping motion is made continuously from side to side as described above, and the final pass is completed past the end of the tile. On the last wiping stroke, as the edge of the tile is reached, it is important that the flap on the leading edge of the mini Wet Jet® pad contacts the surface in order to smooth out the solution at the edges. For tile #2 and #3, the same pad used for tile #1 is re-used, though not re-primed, and the wiping procedure is identical.

Cleaning tests for each pad & test solution are conducted with a total of three replicates to ensure reproducibility. The end result filming/streaking grades are visual and provided by two expert graders. The grades of the graders for the three replicates are averaged and recorded. Grading is on a 0-4 scale, where 0 represents end result perfection and 4 represents the worst possible end result. Grading is performed blind with grade differences provided in ¼ point increments.

Swiffer Wet® Pads:

Pads used are those commercially available in the US as "Swiffer Wet®". For the purposes of the test pads are cut down into thirds, to a dimension of 8.7×10.5 cm along the width of the pad, and then impregnated with 49 grams of solution (average of 16.3 grams per pad). Each of the Swiffer Wet® 'minipads' are used to clean the same 20 cm×20 cm×1 cm Black CeramiCraft brand ceramic tiles described above and are first attached to Swiffer implement cut to size so as to allow the Swiffer Wet attachment layer to fit into the Swiffer implement grippers.

Swiffer Wet® Testing Procedure, Process & Grading

The cleaning test procedure and process for Swiffer Wet® follows that for Swiffer Wet Jet® except that a premoistened Swiffer Wet® minipad (described above) is used in lieu of the Wet Jet minipad. No pad priming is necessary as the Swiffer Wet® pad is already premoistened. The grading scheme is identical to that described for the Wet Jet® portion of the test.

EXAMPLES

The following examples are meant to exemplify compositions used in a process according to the present invention but are not intended to limit the scope of the present invention. The aqueous compositions below are made by combining the listed ingredients in the order given using the listed proportions to form homogenous mixtures (solution % is by weight of active material). The same compositions are used for the Wet Jet® and Swiffer Wet® tests, illustrating two separate ways of practicing the compositions of the present invention.

|  | -1- | -2- | -3- | -4- | -5- | -6- | -7- |
|---|---|---|---|---|---|---|---|
| C10 APG | 0.05% | 0.03% | 0.05% | 0.05% | 0.03% | 0.030% | 0.03% |
| Na LAS**** | — | 0.02% | — | — | 0.02% | 0.020% | 0.02% |
| PnB-TR | 1.00% | 1.00% | 1.00% | 1.00% | 1.00% | 1.40% | 1.00% |
| Ethanol | 3.00% | 3.00% | 3.00% | 3.00% | 3.00% | 2.50% | 3.00% |
| 2-Amino-2-Methyl-1-Propanol | 0.02% | 0.02% | 0.02% | 0.02% | 0.02% | — | — |
| Sodium Carbonate | — | — | — | — | — | 0.05% | — |
| Copolymer I* | — | — | 0.03% | 0.03% | 0.03% | 0.03% | 0.03% |
| Copolymer II** | — | — | — | 0.04% | — | 0.03% | — |
| Suds suppressor*** | 0.0025% | 0.0025% | 0.0025% | 0.0025% | 0.0025% | 0.0025% | 0.0025% |
| Perfume | 0.05% | 0.05% | 0.05% | 0.05% | 0.05% | 0.05% | 0.05% |
| Solution pH | 9.9 | 10.2 | 9.7 | 9.7 | 9.8 | 10.5 | 4.1 |

*polymer derivied from Diquat and acrylic acid molar ratio 33/67 prepared by Rhodia
**polymer derived from DADMAC and acrylic acid, molar ratio 40/60 prepared by Rhodia
***Dow Corning 1410 AF from Dow Corning-Concentration reported is the level of polydimethyl siloxane
****Linear alkyl benzene sulfonate from Pilot Chemical (Calsoft L-40)

Wet Jet® Test Results:

|  | -1- | -2- | -3- | -4- | -5- | -6- | -7- |
|---|---|---|---|---|---|---|---|
| F/S Avg. | 0.50 | 0.54 | 0.46 | 0.58 | 0.67 | 0.50 | 0.42 |
| Soil Cleaning Avg. | 2.42 | 2.33 | 1.67 | 1.71 | 2.04 | 1.96 | 1.88 |
| Redeposition Avg. | 1.63 | 1.71 | 1.08 | 1.33 | 1.46 | 1.00 | 1.33 |
| Avg. | 1.51 | 1.53 | 1.07 | 1.21 | 1.39 | 1.15 | 1.21 |
| Soil Cleaning Avg. | 2.42 | 2.33 | 1.67 | 1.71 | 2.04 | 1.96 | 1.88 |
| Redeposition Avg. | 1.63 | 1.71 | 1.08 | 1.33 | 1.46 | 1.00 | 1.33 |
| Avg. | 2.02 | 2.02 | 1.38 | 1.52 | 1.75 | 1.48 | 1.60 |

Wet Jet® Test Result Discussion:

Overall, the performance of all test products comprising copolymer I is improved vs. controls -1- and -2-. The F/S test (tile #1 average grade) suggests that the benefit of the experimental products is not due to improved filming and streaking properties (range is 0.42 to 0.67 for the products -3- through -7- vs. 0.54 and 0.52 for control products -1- and -2-). Cleaning and redeposition grades (tiles #2 and #3 grades, respectively) are significantly better for the experimental products, driving an overall improved average grade for products -3- through -7- vs. controls -1- and -2-. Among the compositions comprising copolymer I, product -5-, which is alkaline and does not contain either copolymer H or NaLAS, performed the worst. An improvement in cleaning and especially redeposition performance is achieved in product -6- via addition of copolymer II.

Swiffer Wet® Test Results:

|                  | -1-  | -2-  | -3-  | -4-  | -5-  | -6-  | -7-  |
|------------------|------|------|------|------|------|------|------|
| F/S Avg.         | 0.54 | 0.63 | 0.54 | 0.42 | 0.58 | 0.92 | 0.71 |
| Soil Cleaning Avg. | 1.83 | 1.96 | 1.38 | 1.13 | 1.21 | 1.42 | 1.33 |
| Redeposition Avg. | 1.50 | 1.58 | 0.67 | 0.50 | 0.79 | 0.88 | 0.63 |
| Avg.             | 1.29 | 1.39 | 0.86 | 0.68 | 0.86 | 1.07 | 0.89 |
| Soil Cleaning Avg. | 1.83 | 1.96 | 1.38 | 1.13 | 1.21 | 1.42 | 1.33 |
| Redeposition Avg. | 1.50 | 1.58 | 0.67 | 0.50 | 0.79 | 0.88 | 0.63 |
| Avg.             | 1.67 | 1.77 | 1.03 | 0.82 | 1.00 | 1.15 | 0.98 |

Swiffer Wet® Test Result Discussion:

Overall, the performance of all test products comprising copolymer I is improved vs. controls -1- and -2-. The F/S test (tile #1 average grade) suggests that the benefit of the experimental products is not due to improved filming and streaking properties (range is 0.42 to 0.92 for the products -3- through -7- vs. 0.54 and 0.63 for control products -1- and -2-). Cleaning and redeposition grades (tiles #2 and #3 grades, respectively) are significantly better for the experimental products, driving an overall improved average grade for products -3- through -7- vs. controls -1- and -2-. Unlike the Swiffer Wet Jet test, product -5- performed on par with the other experimental products in the test. The nonwoven substrate attenuates pH, driving it toward neutrality. As a result, pH effects less important in a Swiffer Wet® context. Also, it is noteworthy that the polymer benefits are larger in the Swiffer Wet® context, likely because the polymer(s) is (are) already anchored on the premoistened wipe even before the test begins. This contrasts with the Wet Jet® application for which the substrate is dry and does not comprise polymer at the beginning of the test.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A kit for cleaning a surface comprising:
   a nonwoven substrate comprising negatively charged fibers; and
   a composition comprising from 0.005% to 0.03%, by weight of said composition, of a water-soluble or water-dispersible copolymer I comprising:
   (a) at least a monomer compound of general formula i:

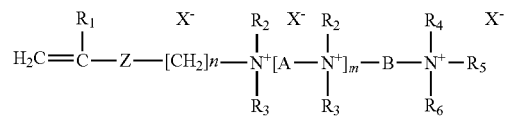

in which
   $R_1$ is a hydrogen atom, a methyl or ethyl group;
   $R_2$, $R_3$, $R_4$, $R_5$ and $R_6$, which are identical or different, are linear or branched $C_1$-$C_6$, alkyl, hydroxyalkyl or aminoalkyl groups;
   m is an integer from 0 to 10;
   n is an integer from 1 to 6;
   Z represents a —C(O)O— or —C(O)NH— group or an oxygen atom;
   A represents a $(CH_2)_p$ group, p being an integer from 1 to 6;
   B represents a linear or branched $C_2$—$C_{12}$, polymethylene chain optionally interrupted by one or more heteroatoms or heterogroups, and optionally substituted by one or more hydroxyl or amino groups;
   X, which are identical or different, represent counterions; and
   (b) at least one hydrophilic monomer carrying a functional acidic group which is copolymerizable with (a) and which is capable of being ionized in the application medium;
   (c) optionally at least one monomer compound with ethylenic unsaturation with a neutral charge which is copolymerizable with (a) and (b), preferably a hydrophilic monomer compound with ethylenic unsaturation with a neutral charge, carrying one or more hydrophilic groups, which is copolymerizable with (a) and (b).

2. A kit according to claim 1 wherein the composition is impregnated into the substrate.

3. A kit according to claim 1 wherein the nonwoven substrate comprises a floor sheet consisting essentially of a 10 $gm^{-2}$ to 50 $gm^{-2}$ nonwoven comprising at least 20% synthetic fibers; a liquid reservoir layer consisting essentially of a 50 $gm^{-2}$ to 150 $gm^{-2}$ nonwoven comprising at least 60% cellulose-derived fibers; and an optional attachment layer consisting essentially of a 10 $gm^{-2}$ to 50 $gm^{-2}$ nonwoven.

4. A kit according to claim 3 wherein the floor sheet and attachment layers are coformed together.

5. A kit according to claim 1 wherein the composition comprises a nonionic, zwitterionic, amphoteric surfactant or mixtures thereof.

6. A kit according to claim 1 wherein the composition is acidic.

7. A kit according to claim 1 further comprising a surface stickiness mitigator selected from the group consisting of an alkyl aryl anionic surfactant, a copolymer II comprising:
   (d) at least one monomer having the general formula:

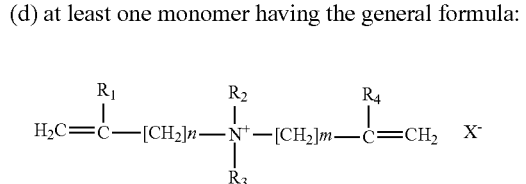

in which, $R_1$ and $R_4$ independently represent H or a C1-6 linear or branched alkyl group $R_2$ and $R_3$ independently represent a linear or branched C1-6 alkyl, hydroxyalkyl or aminoalkyl group, preferably a methyl group n and m are integers of between 1 and 3

X represents a counterion compatible with the water-soluble or water-dispersible nature of the polymer;

(e) at least one hydrophilic monomer with an acid functionality that is copolymerisable with monomer (d) and capable of ionizing in the medium in which it is used; and (f) optionally an ethylenically unsaturated hydrophilic monomer compound of neutral charge bearing one or several hydrophilic groups which is copolymerisable with monomers (d) and (e), the monomer (d) to monomer (e) ratio ranging from between 60:40 and 5:95; and mixtures thereof.

8. A kit according to claim 1 wherein said copolymer I is present in an amount from 0.01% to 0.03% by weight of said composition.

\* \* \* \* \*